United States Patent
Chen et al.

(10) Patent No.: US 9,017,436 B2
(45) Date of Patent: Apr. 28, 2015

(54) FUEL PROCESSING SYSTEMS WITH THERMALLY INTEGRATED COMPONENTRY

(75) Inventors: Zhen Chen, Bend, OR (US); John Karim Kamel Ibrahim, Venetia, PA (US); Xun Ouyang, Bend, OR (US); Curtiss Renn, Bend, OR (US); Ryan Thomas Sturko, Bend, OR (US)

(73) Assignee: DCNS, La Montagne (FR)

( * ) Notice: Subject to any disclaimer, the term of this patent is extended or adjusted under 35 U.S.C. 154(b) by 1073 days.

(21) Appl. No.: 13/027,584

(22) Filed: Feb. 15, 2011

(65) Prior Publication Data

US 2011/0136027 A1     Jun. 9, 2011

Related U.S. Application Data

(63) Continuation-in-part of application No. 12/546,579, filed on Aug. 24, 2009, now abandoned.

(60) Provisional application No. 61/307,750, filed on Feb. 24, 2010, provisional application No. 61/092,038, filed on Aug. 26, 2008, provisional application No. 61/110,693, filed on Nov. 3, 2008.

(51) Int. Cl.
*C01B 3/00* (2006.01)
*C01B 3/32* (2006.01)
(Continued)

(52) U.S. Cl.
CPC . *H01M 6/44* (2013.01); *C01B 3/38* (2013.01); *C01B 3/32* (2013.01);
(Continued)

(58) Field of Classification Search
CPC ................................. B01J 8/06; C01B 3/26
USPC .................................................................. 48/61
See application file for complete search history.

(56) References Cited

U.S. PATENT DOCUMENTS 2,824,620 A     2/1958   De Rosset
3,336,730 A     8/1967   McBride et al.
(Continued)

FOREIGN PATENT DOCUMENTS

EP     0752390     10/1998
EP     1444475     7/2007
(Continued)

OTHER PUBLICATIONS

International Search Report and Written Opinion for PCT Patent Application Serial No. PCT/US11/25653, dated May 9, 2011.

*Primary Examiner* — Matthew Merkling
(74) *Attorney, Agent, or Firm* — Dascenzo Intellectual Property Law, P.C.

(57) ABSTRACT

Hydrogen-producing assemblies, fuel cell systems including the same, methods of producing hydrogen gas, and methods of powering an energy-consuming device. Hydrogen-producing assemblies may include a monolithic body that defines at least a reforming conduit, and in some embodiments a plurality of reforming conduits, in which a feed stream is catalyzed into a reformate gas stream containing hydrogen gas, and a burner conduit, in which a fuel-air stream is combusted. The monolithic body is constructed to conduct heat generated by the exothermic reaction of the combustion from the burner conduit to the reformer conduit. In some hydrogen-producing assemblies, the monolithic body further defines a vaporizing conduit, in which liquid portions of the feed stream are vaporized prior to being delivered to the reformer conduit, and the monolithic body may be constructed to conduct heat from the burner conduit to the vaporizing conduit.

11 Claims, 12 Drawing Sheets

(51) Int. Cl.
*H01M 6/44* (2006.01)
*C01B 3/38* (2006.01)
*H01M 8/04* (2006.01)
*H01M 8/06* (2006.01)
*H01M 16/00* (2006.01)

(52) U.S. Cl.
CPC .. *C01B 2203/0811* (2013.01); *H01M 8/04022* (2013.01); *H01M 8/0618* (2013.01); *H01M 8/0631* (2013.01); *H01M 16/003* (2013.01); *Y02E 60/50* (2013.01)

(56) References Cited

U.S. PATENT DOCUMENTS

| | | |
|---|---|---|
| 3,338,681 A | 8/1967 | Kordesch |
| 3,350,176 A | 10/1967 | Green et al. |
| 3,469,944 A | 9/1969 | Bocard et al. |
| 3,522,019 A | 7/1970 | Buswell et al. |
| 3,655,448 A | 4/1972 | Setzer |
| 3,943,719 A | 3/1976 | Terry et al. |
| 3,954,417 A | 5/1976 | Jalbing |
| 4,055,962 A | 11/1977 | Terry |
| 4,098,959 A | 7/1978 | Fanciullo |
| 4,098,960 A | 7/1978 | Gagnon |
| 4,101,287 A | 7/1978 | Sweed et al. |
| 4,175,165 A | 11/1979 | Adlhart |
| 4,214,867 A | 7/1980 | Hunter et al. |
| 4,214,969 A | 7/1980 | Lawrance |
| 4,468,235 A | 8/1984 | Hill |
| 5,401,589 A | 3/1995 | Palmer et al. |
| 5,432,710 A | 7/1995 | Ishimaru et al. |
| 5,614,001 A | 3/1997 | Kosaka et al. |
| 5,637,414 A | 6/1997 | Inoue et al. |
| 5,861,137 A | 1/1999 | Edlund |
| 5,980,838 A | 11/1999 | von Hippel et al. |
| 5,997,594 A | 12/1999 | Edlund et al. |
| 6,083,637 A | 7/2000 | Walz et al. |
| 6,165,633 A | 12/2000 | Negishi |
| 6,180,081 B1 | 1/2001 | Poschmann et al. |
| 6,203,587 B1 | 3/2001 | Lesieur et al. |
| 6,221,117 B1 | 4/2001 | Edlund et al. |
| 6,241,875 B1 | 6/2001 | Gough |
| 6,319,306 B1 | 11/2001 | Edlund et al. |
| 6,376,113 B1 | 4/2002 | Edlund et al. |
| 6,383,670 B1 | 5/2002 | Edlund et al. |
| 6,494,937 B1 | 12/2002 | Edlund et al. |
| 6,495,277 B1 | 12/2002 | Edlund et al. |
| 6,520,249 B2 | 2/2003 | Iwamoto et al. |
| 6,537,352 B2 | 3/2003 | Edlund et al. |
| 6,562,111 B2 | 5/2003 | Edlund et al. |
| 6,616,738 B2 | 9/2003 | Iwamoto et al. |
| 6,746,790 B2 | 6/2004 | Colborn |
| 6,770,106 B1 | 8/2004 | Okamoto et al. |
| 6,881,703 B2 | 4/2005 | Cutler et al. |
| 6,887,601 B2 | 5/2005 | Moulthrop, Jr. et al. |
| 6,929,785 B2 | 8/2005 | Grieve et al. |
| 7,108,933 B2 | 9/2006 | Gelsey |
| 7,115,148 B2 | 10/2006 | Wheeldon et al. |
| 7,128,769 B2 | 10/2006 | Renn et al. |
| 7,169,213 B2 | 1/2007 | Liu et al. |
| 7,267,697 B2 | 9/2007 | Viola et al. |
| 7,285,153 B2 | 10/2007 | Bruun et al. |
| 7,381,488 B2 | 6/2008 | Katikaneni et al. |
| 7,476,455 B2 | 1/2009 | Edlund |
| 7,659,019 B2 | 2/2010 | Edlund |
| 2001/0045061 A1 | 11/2001 | Edlund et al. |
| 2002/0020299 A1 | 2/2002 | Iwamoto et al. |
| 2002/0064487 A1* | 5/2002 | Sederquist et al. ........... 422/197 |
| 2003/0155290 A1 | 8/2003 | Chanaud |
| 2003/0192251 A1 | 10/2003 | Edlund et al. |
| 2003/0223926 A1 | 12/2003 | Edlund et al. |
| 2004/0175326 A1* | 9/2004 | Hershkowitz et al. ........ 423/652 |
| 2005/0011125 A1 | 1/2005 | Kaye et al. |
| 2005/0079397 A1 | 4/2005 | Winkelmann et al. |
| 2006/0090397 A1 | 5/2006 | Edlund et al. |
| 2006/0147771 A1 | 7/2006 | Russell et al. |
| 2006/0156627 A1 | 7/2006 | Brantley et al. |
| 2006/0272212 A1 | 12/2006 | Edlund |
| 2007/0009426 A1 | 1/2007 | Leveson |
| 2007/0062116 A1 | 3/2007 | Edlund et al. |
| 2008/0008646 A1 | 1/2008 | Kaye |
| 2008/0008914 A1 | 1/2008 | Edlund |
| 2008/0016767 A1 | 1/2008 | Brantley et al. |
| 2008/0118796 A1 | 5/2008 | Brantley et al. |
| 2008/0171241 A1 | 7/2008 | Kaye et al. |
| 2008/0187797 A1 | 8/2008 | Edlund |
| 2008/0213638 A1 | 9/2008 | Brantley et al. |
| 2008/0268303 A1 | 10/2008 | Eickhoff |
| 2008/0289180 A1 | 11/2008 | Brantley |
| 2010/0028223 A1 | 2/2010 | Popham et al. |

FOREIGN PATENT DOCUMENTS

| | | |
|---|---|---|
| JP | H03-109202 | 5/1991 |
| WO | WO 02/27814 | 4/2002 |
| WO | WO 03/033985 | 4/2003 |
| WO | WO2006/050335 | 5/2006 |
| WO | WO 2006/069057 | 6/2006 |
| WO | WO 2007/008581 | 1/2007 |

\* cited by examiner

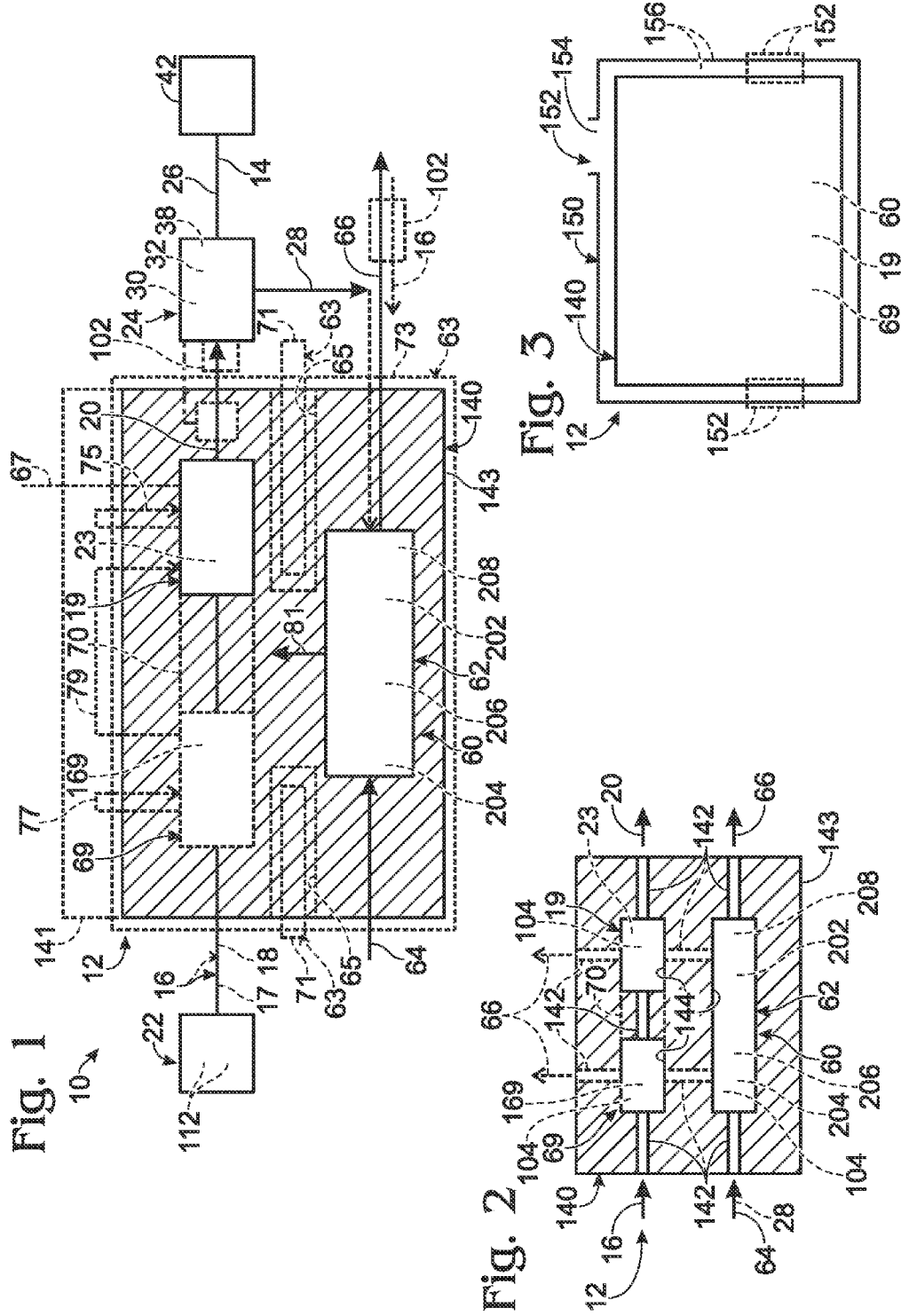

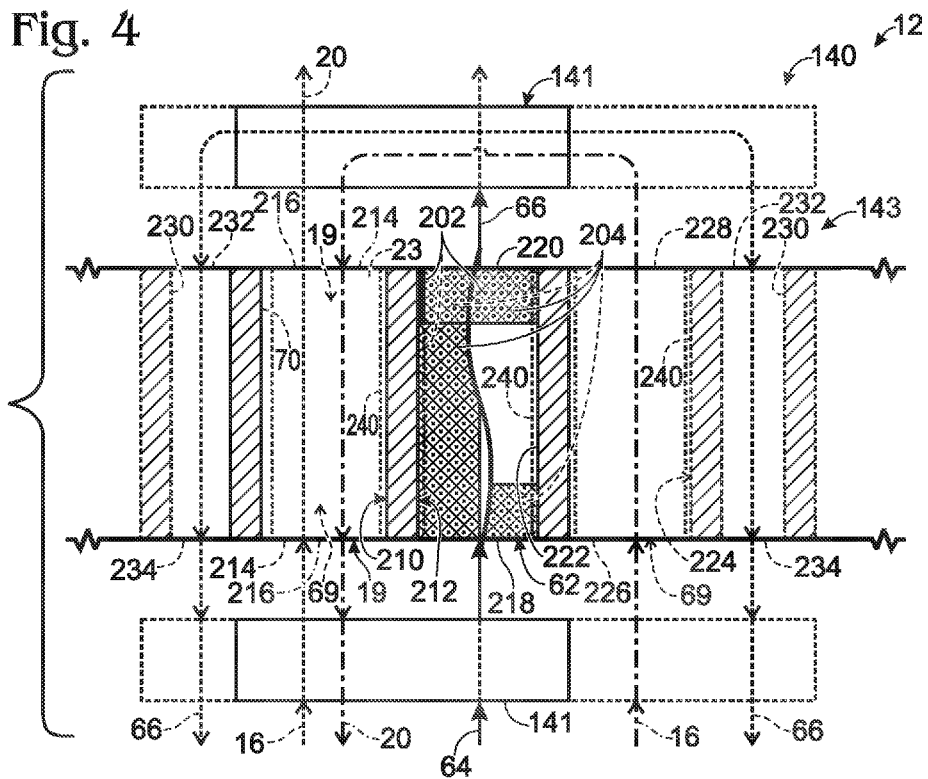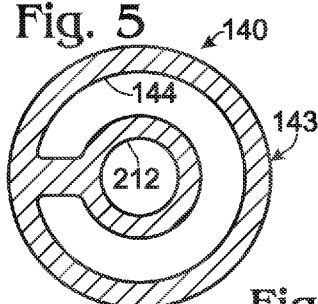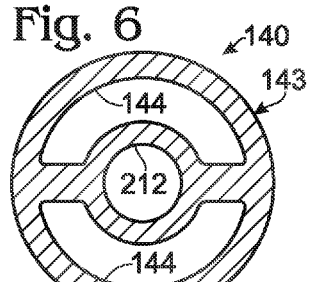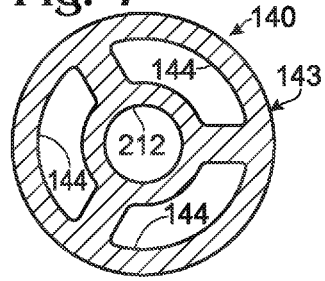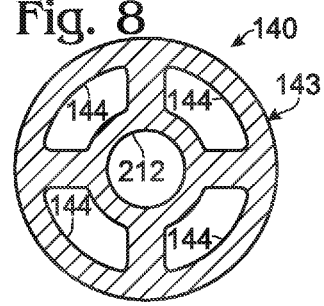

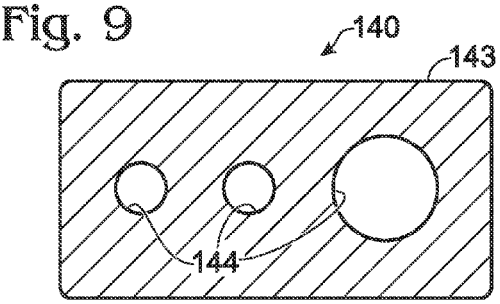
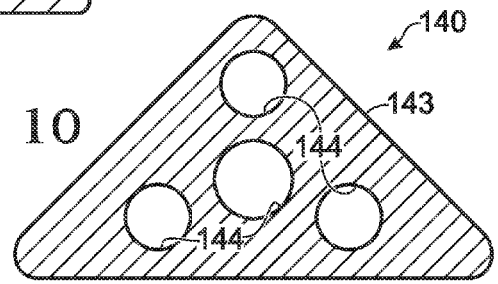
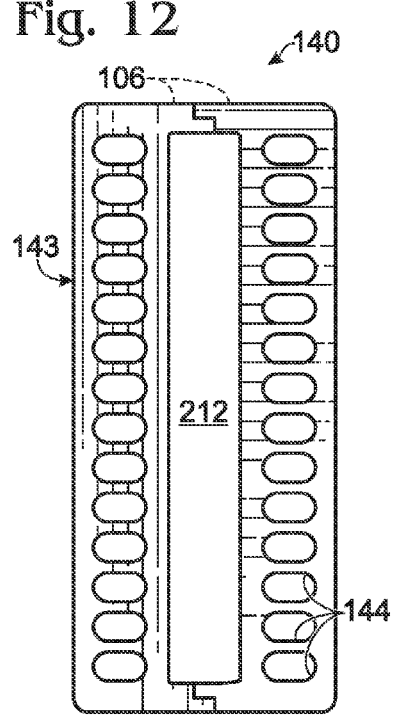
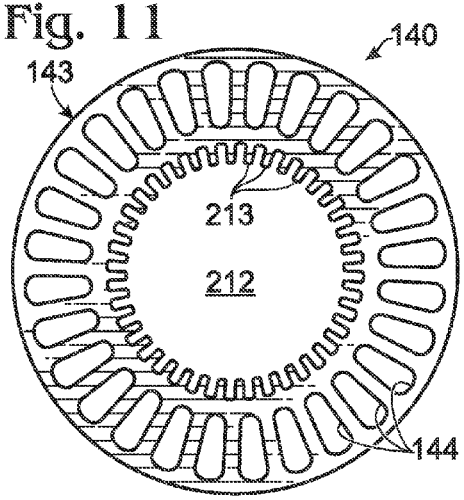

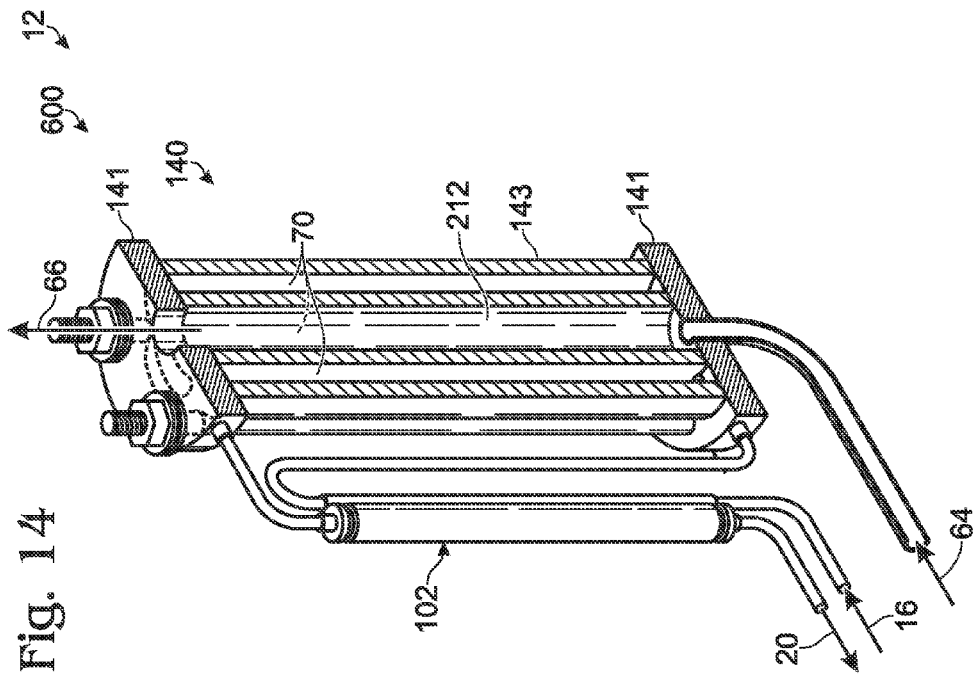
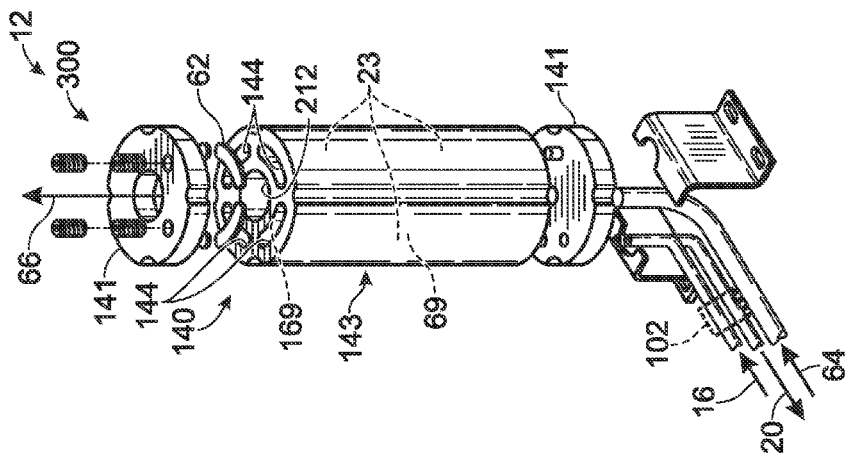

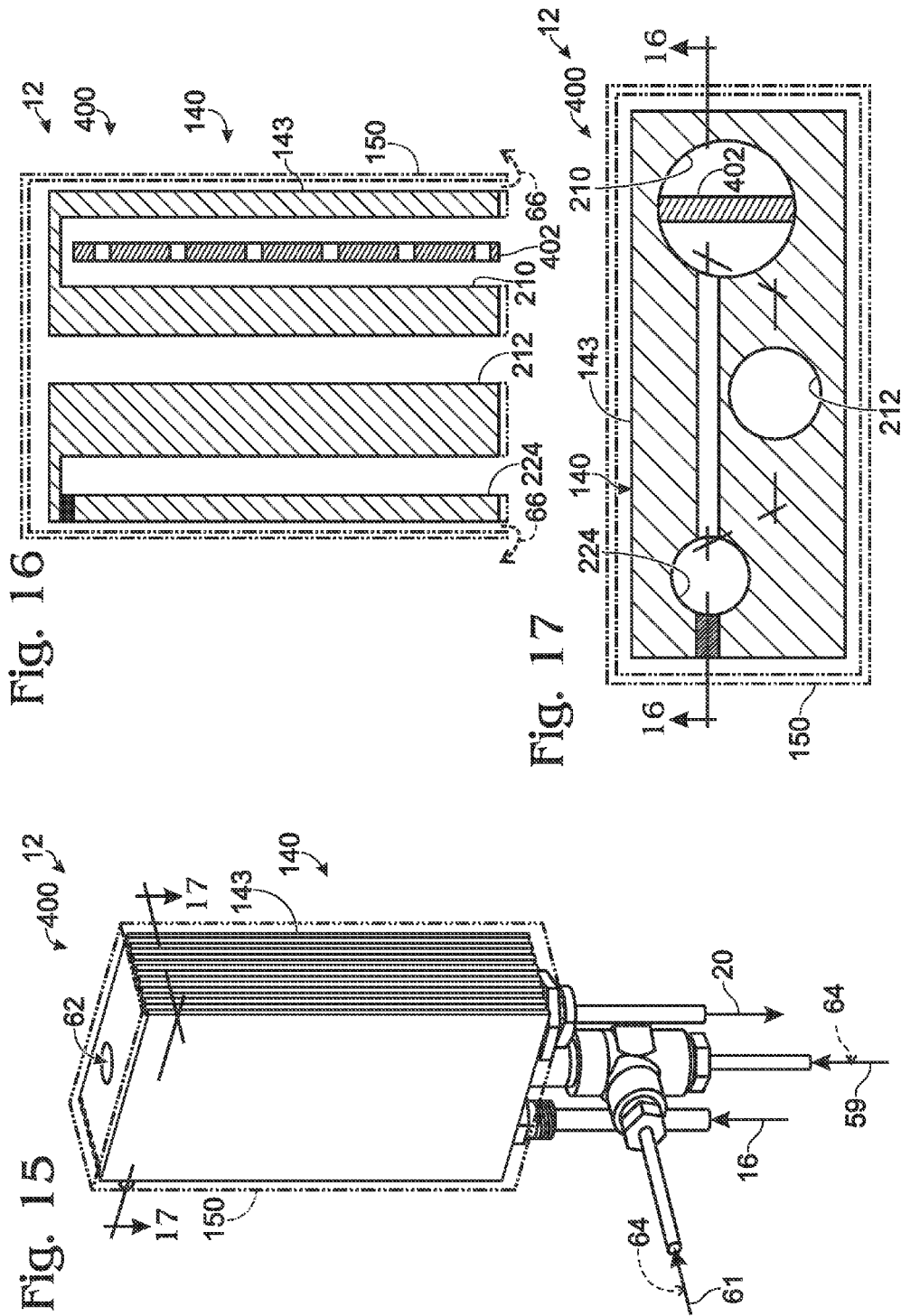

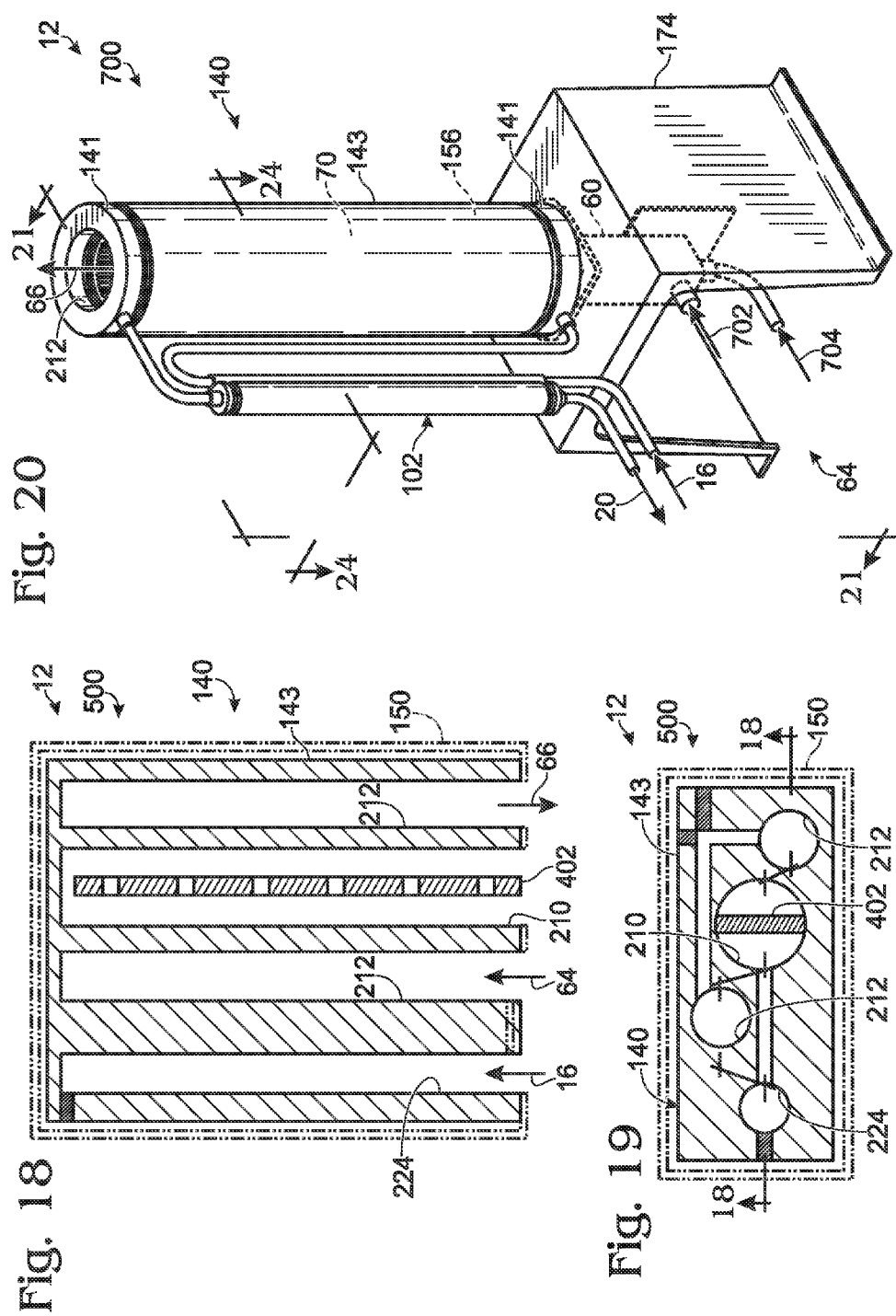

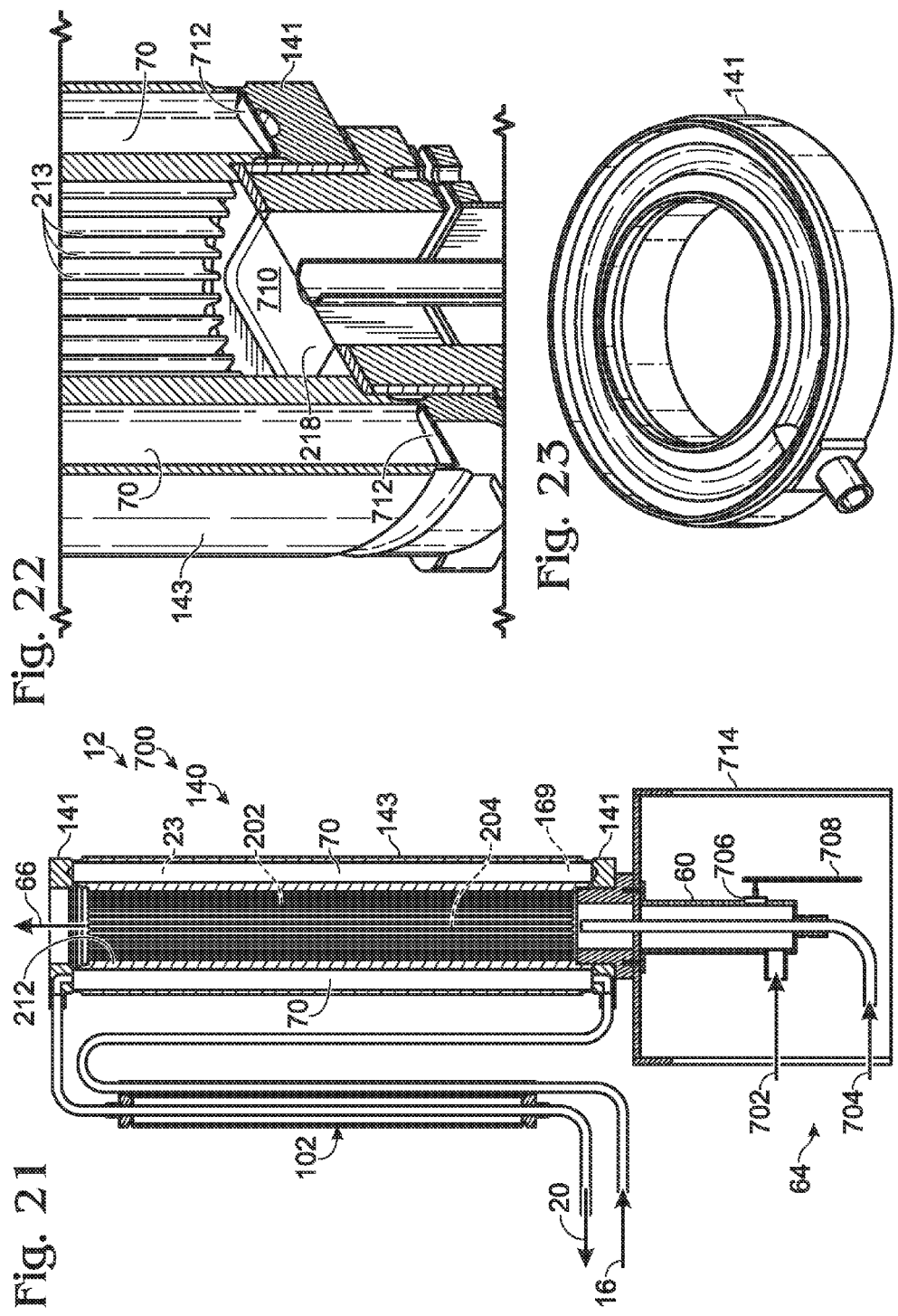

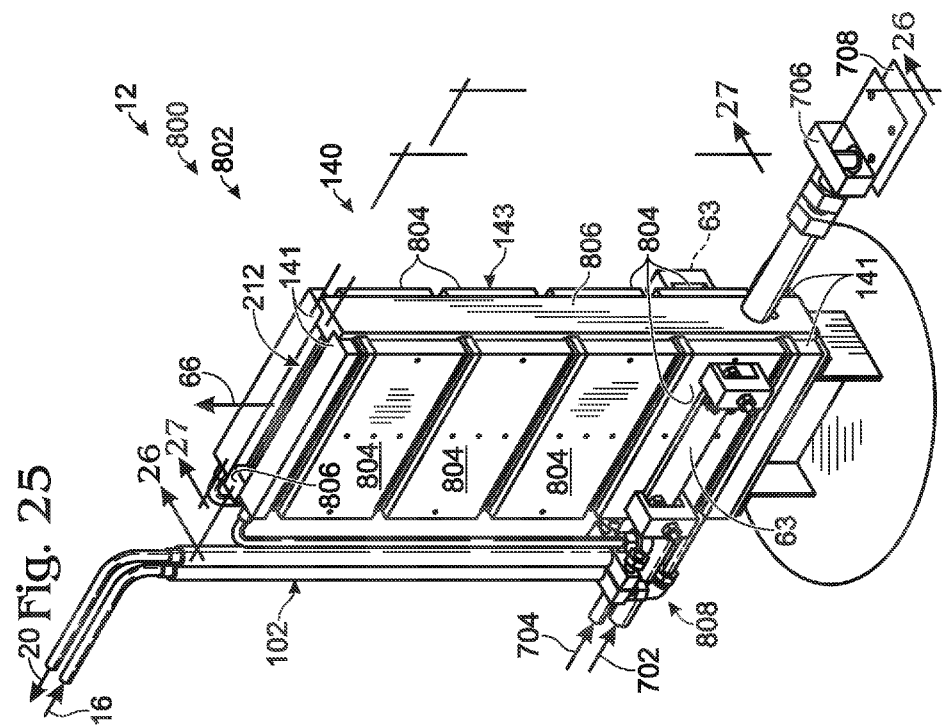
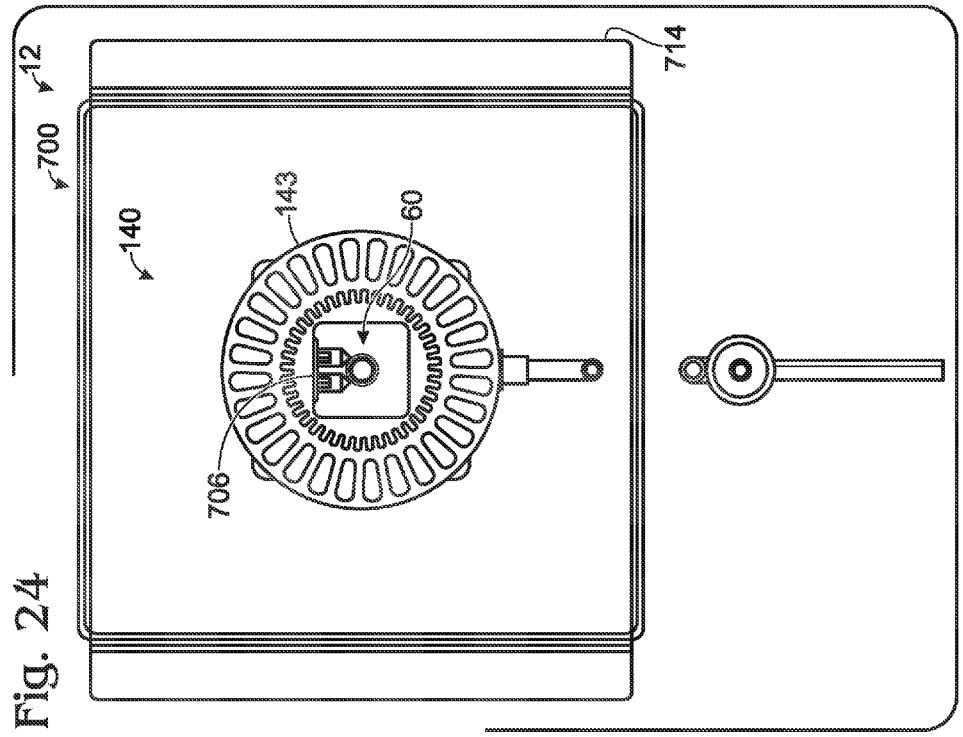

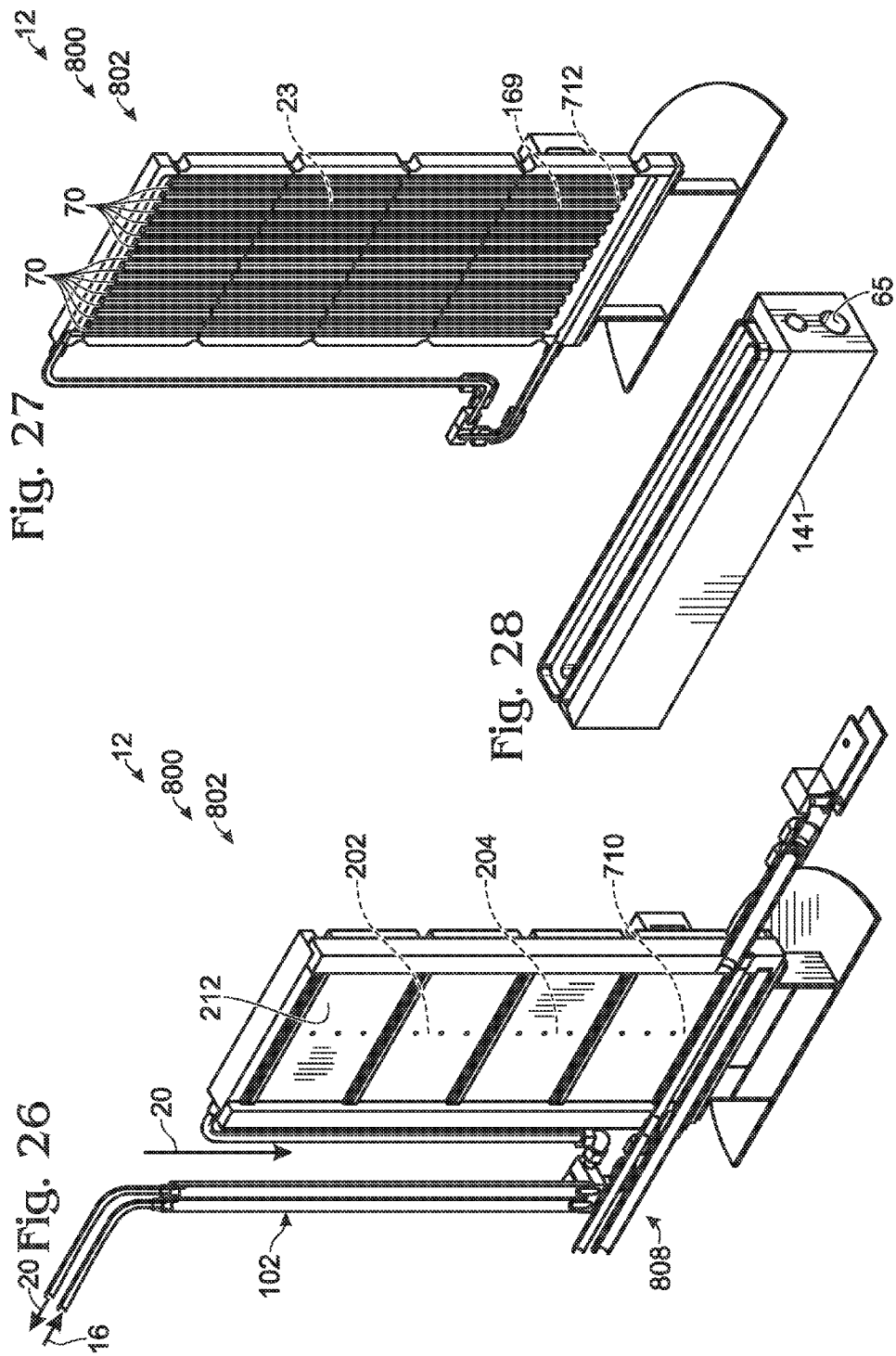

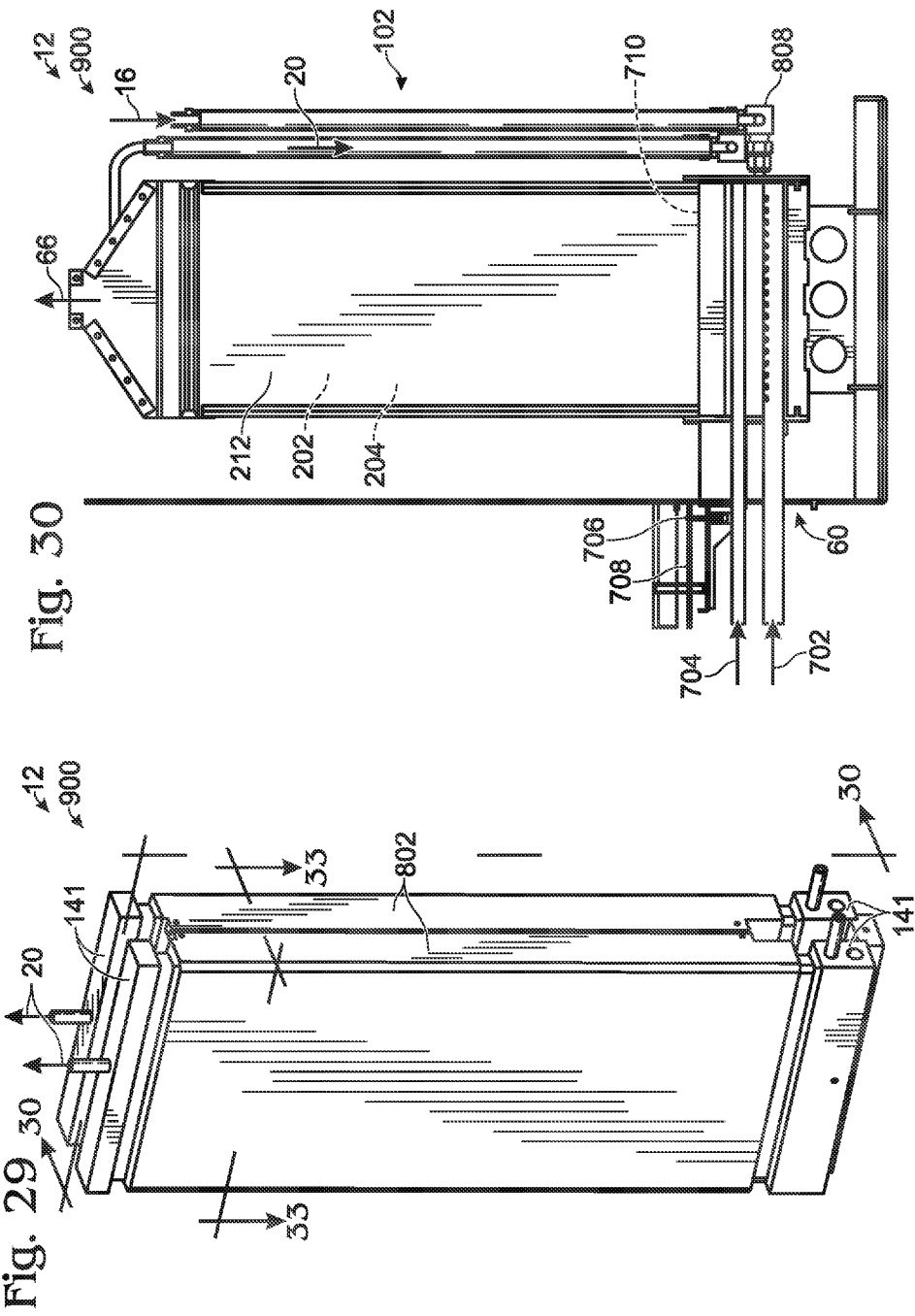

FUEL PROCESSING SYSTEMS WITH THERMALLY INTEGRATED COMPONENTRY

RELATED APPLICATIONS

The present application claims priority to U.S. Provisional Patent Application Ser. No. 61/307,750, which was filed on Feb. 24, 2010, and to U.S. patent application Ser. No. 12/546,579, which was filed on Aug. 24, 2009 and which claims priority to U.S. Provisional Patent Application Ser. Nos. 61/092,038 and 61/110,693. The disclosures of these patent applications are hereby incorporated by reference.

FIELD OF THE DISCLOSURE

The present disclosure is directed generally to hydrogen-producing assemblies, fuel cell systems including the same, methods of producing hydrogen gas, and methods of powering an energy-consuming device, and more particularly to hydrogen-producing assemblies that include a conductive monolithic body that defines at least a burner conduit and a reforming conduit in a conductive heat exchange relationship with the burner conduit within the monolithic body, fuel cell systems including the same, methods of producing hydrogen gas using the same, and methods of powering an energy-consuming device using the same and a fuel cell stack.

BACKGROUND OF THE DISCLOSURE

Hydrogen-producing fuel processing systems, or assemblies, include a series of devices or components that produce hydrogen gas as a primary reaction product from one or more reactants, or feedstocks. The fuel processing system includes a fuel processing assembly with a hydrogen-producing region that is adapted to convert the one or more feedstocks into a product stream containing hydrogen gas as a majority component. In operation, the hydrogen-producing region is typically operated at an elevated temperature and pressure and contains a suitable catalyst to produce at least hydrogen gas from the feedstock(s) delivered thereto. The produced hydrogen gas may be used in a variety of applications. One such application is energy production, such as by electrochemical fuel cells. An electrochemical fuel cell is a device that converts a fuel and an oxidant to electricity, a reaction product, and heat. For example, fuel cells may convert hydrogen and oxygen gases into water and electricity. In such fuel cells, the hydrogen gas is the fuel, the oxygen gas is the oxidant, and the water is the reaction product. Fuel cells are typically coupled together to form a fuel cell stack.

Hydrogen-producing fuel processing assemblies and systems typically include a series of interconnected functional components that collectively produce hydrogen gas from one or more reactants, or feedstocks. These components include at least one reactor, hydrogen-producing region, or reforming region, in which hydrogen gas is produced by chemical reaction of the feedstock(s), which may be delivered to the hydrogen-producing region in one or more feed streams by a pump or other suitable feedstock delivery system. When a feedstock is a liquid feedstock at ambient conditions, the functional components may include a vaporizer, or vaporization region. A heating assembly, such as a burner, may consume a fuel to produce a combustion exhaust stream that may be used to heat at least the vaporization region, such as at least to a suitable temperature to vaporize the liquid feedstock. When the hydrogen-producing region utilizes an endothermic reaction, such as a steam reforming reaction, it may be thought of as a reforming region and the combustion exhaust stream may be utilized to heat the reforming region to at least a minimum hydrogen-producing temperature. The reformate stream produced by the reforming region may be delivered to a fuel cell stack, and optionally may first be delivered to a separation assembly to increase the hydrogen purity of the stream that is delivered to the fuel cell stack.

Typically, the components of the fuel processing assembly and/or fuel processing system are discrete components that include individual shells or housings and which are interconnected by tubing or similar fluid conduits, fittings, and the like. The entire fuel processing system may be enclosed in a system enclosure or system housing, but the individual components typically are positioned in a spaced-apart relationship within the housing, with the housing defining an open chamber, or cavity, within which the individual components are positioned. The separate structures of these components, and the fluid conduits used to seal and interconnect these components, contribute to the number of parts, potential leak points, assembly time, and manufacturing expense of the fuel processing system. Also, the spatially separated orientation of conventional fuel processing assemblies increases the thermal management needs of the fuel processing system. These needs may be exacerbated by the conventional use of steel alloy housings for components of at least the fuel processing assembly, such as at least the vaporization region and reforming or other hydrogen-producing region thereof. Due to the low thermal conductivity of steel alloys, the surface area of the housing often has to be largely enhanced (e.g., through finned tubes or plate heat exchangers) or a high heat transfer rate has to be imposed on these components (e.g., through direct flame impingement), which may result in increased design cost or lower reliability, respectively.

SUMMARY OF THE DISCLOSURE

Hydrogen-producing assemblies, fuel processing systems, and fuel cell systems according to the present disclosure are designed to efficiently utilize heat generated by a heating source in the production of hydrogen gas. Accordingly, hydrogen-producing assemblies according to the present disclosure include a monolithic body that defines at least a reforming conduit, in which a feed stream is catalyzed into a reformate gas stream containing hydrogen gas as a primary component, and a burner conduit, in which a fuel-air stream is combusted. The monolithic body is constructed to conduct heat generated by the exothermic combustion reaction within the burner conduit to the reforming conduit, which is positioned in a conductive heat exchange relationship, or position, within the monolithic body relative to the burner conduit. In some hydrogen-producing assemblies according to the present disclosure, the monolithic body further defines a vaporizing conduit, in which liquid portions of the feed stream are vaporized prior to being delivered to the reforming conduit. In such embodiments, the monolithic body is constructed to conduct heat from the burner conduit to the vaporizing conduit. In some embodiments, the reforming conduit defines both a reforming region and a vaporizing region, and a separate vaporizing conduit is not necessary (although still may be provided in some embodiments). In such embodiments, the reforming conduit may additionally or alternatively be referred to as a combined vaporizing/reforming conduit. In some hydrogen-producing assemblies according to the present disclosure, the burner conduit extends along a central longitudinal axis of the monolithic body, and one or more reforming conduits, vaporizing conduits (when present), and/or the combined vaporizing/reforming conduits (when present) are spaced radially from the burner conduit in a concentric pattern through the monolithic body.

Methods of producing hydrogen gas using hydrogen-producing assemblies according to the present disclosure, and methods of powering an energy-consuming device using a hydrogen-producing assembly according to the present disclosure and a fuel cell stack are also disclosed.

BRIEF DESCRIPTION OF THE DRAWINGS

FIG. 1 is a schematic diagram of hydrogen-producing fuel processing systems according to the present disclosure, schematically illustrated together with an optional fuel cell stack for powering an energy-consuming device.

FIG. 2 is a schematic diagram of illustrative, non-exclusive examples of hydrogen-producing assemblies according to the present disclosure.

FIG. 3 is another schematic diagram of illustrative, non-exclusive examples of hydrogen-producing assemblies according to the present disclosure.

FIG. 4 is a somewhat schematic exploded cross-sectional diagram of illustrative, non-exclusive examples of hydrogen-producing assemblies according to the present disclosure.

FIG. 5 is a schematic cross-sectional view of an illustrative non-exclusive example of a hydrogen-producing assembly according to the present disclosure.

FIG. 6 is a schematic cross-sectional view of another illustrative non-exclusive example of a hydrogen-producing assembly according to the present disclosure.

FIG. 7 is a schematic cross-sectional view of another illustrative non-exclusive example of a hydrogen-producing assembly according to the present disclosure.

FIG. 8 is a schematic cross-sectional view of another illustrative non-exclusive example of a hydrogen-producing assembly according to the present disclosure.

FIG. 9 is a schematic cross-sectional view of another illustrative non-exclusive example of a hydrogen-producing assembly according to the present disclosure.

FIG. 10 is a schematic cross-sectional view of another illustrative non-exclusive example of a hydrogen-producing assembly according to the present disclosure.

FIG. 11 is a cross-sectional view of another illustrative non-exclusive example of a hydrogen-producing assembly according to the present disclosure.

FIG. 12 is a cross-sectional view of another illustrative non-exclusive example of a hydrogen-producing assembly according to the present disclosure.

FIG. 13 is an exploded perspective view of an illustrative, non-exclusive example of a hydrogen-producing assembly according to the present disclosure.

FIG. 14 is a cross-sectional perspective view of another illustrative, non-exclusive example of a hydrogen-producing assembly according to the present disclosure.

FIG. 15 is a perspective view of another illustrative, non-exclusive example of a hydrogen-producing assembly according to the present disclosure.

FIG. 16 is a cross-sectional view of the heat transfer body of the hydrogen-producing assembly of FIG. 15, taken generally along line 16-16 in FIG. 17.

FIG. 17 is another cross-sectional view of the heat transfer body of the hydrogen-producing assembly of FIG. 15, taken generally along line 17-17 in FIG. 15.

FIG. 18 is a cross-sectional view of another illustrative, non-exclusive example of a heat transfer body of a hydrogen-producing assembly according to the present disclosure, taken generally along line 18-18 in FIG. 19.

FIG. 19 is another cross-sectional view of the heat transfer body of FIG. 18, with the cross-section similar to the cross-section of FIG. 17.

FIG. 20 is a perspective view of another illustrative, non-exclusive example of a hydrogen-producing assembly according to the present disclosure.

FIG. 21 is a cross-sectional side view of the hydrogen-producing assembly of FIG. 20, taken generally along line 21-21 in FIG. 20.

FIG. 22 is a cross-sectional perspective view of a portion of the hydrogen-producing assembly of FIG. 20, generally corresponding to the cross-section of FIG. 21.

FIG. 23 is a perspective view of an end cap manifold of the hydrogen-producing assembly of the fuel processing system of FIG. 20.

FIG. 24 is a cross-section top view of the hydrogen-producing assembly of FIG. 20, taken generally along line 24-24 in FIG. 20.

FIG. 25 is a perspective view of another illustrative, non-exclusive example of a hydrogen-producing assembly according to the present disclosure.

FIG. 26 is a cross-sectional perspective view of the hydrogen-producing assembly of FIG. 25, taken generally along line 26-26 in FIG. 25.

FIG. 27 is a cross-sectional perspective view of the hydrogen-producing assembly of FIG. 25, taken generally along line 27-27 in FIG. 25.

FIG. 28 is a perspective view of an end cap inlet manifold of the hydrogen-producing assembly of the fuel processing system of FIG. 25.

FIG. 29 is a perspective view of another illustrative, non-exclusive example of a hydrogen-producing assembly according to the present disclosure.

FIG. 30 is a cross-sectional side view of the hydrogen-producing assembly of FIG. 29 with the cross-section taken generally along line 30-30 in FIG. 29, and shown with additional feed, exhaust, burner, heat exchange, and mounting components.

DETAILED DESCRIPTION AND BEST MODE OF THE DISCLOSURE

Figure 31:
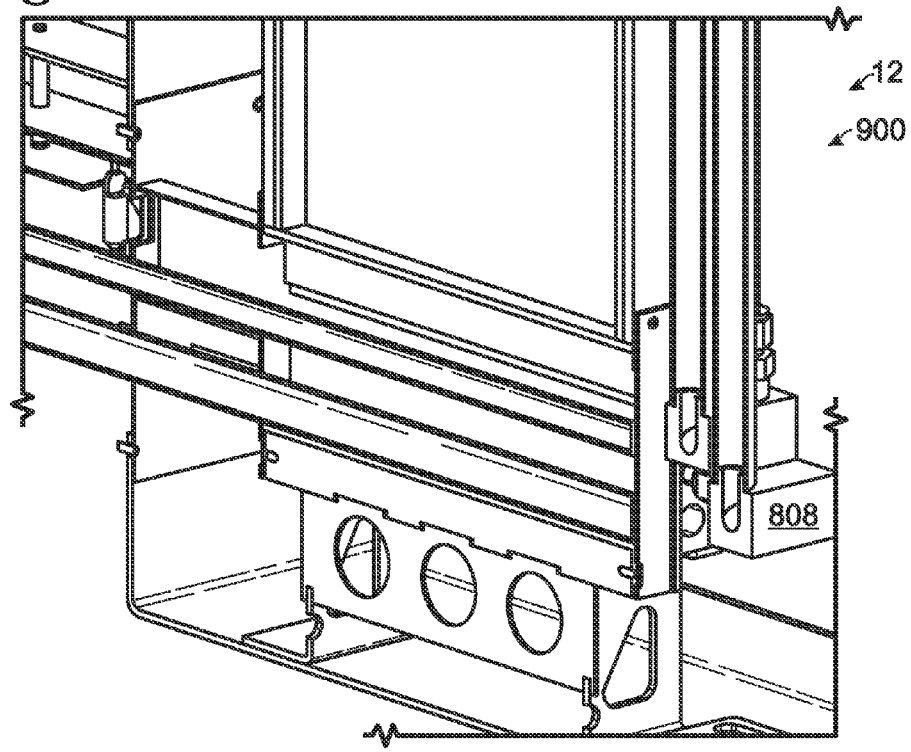
FIG. 31 is a cross-sectional perspective view of a portion of the hydrogen-producing assembly of FIG. 30, with the cross-section generally corresponding to the cross-section of FIG. 30.

Fuel processing systems according to the present disclosure are schematically illustrated in FIG. 1 and generally indicated at 10. In FIG. 1, fuel processing systems 10 are schematically illustrated together with an optional fuel cell stack 42, which may be used to power an energy-consuming device, as discussed herein. Fuel processing systems 10 include a hydrogen-producing fuel processing assembly, or hydrogen-producing assembly, 12 and are adapted to produce a product hydrogen stream 14 containing hydrogen gas as a majority component, and in many embodiments at least substantially pure hydrogen gas, from one or more feed streams 16. Feed stream 16 may be drawn or otherwise received from one or more sources, or supplies, 112 by feedstock delivery system 22 and thereafter delivered to hydrogen-producing assembly 12. It is thus within the scope of the present disclosure that the one or more sources, or supplies, may be a portion of the feedstock delivery system or may be external sources or supplies with which the feedstock delivery system is in fluid communication to receive the feed stream(s), or components thereof, from the one or more sources or supplies.

Although much of the following discussion of feed streams will refer to liquid feed streams, or at least feed streams that are liquid at ambient conditions, it is within the scope of the present disclosure that feed stream 16 may be a liquid feed stream when drawn or otherwise received from a suitable source, a gaseous feed stream, or a feed stream that includes liquid and gaseous components.

Feed stream 16 includes at least one feedstock 18 and may include water 17. Illustrative, non-exclusive examples of feedstocks according to the present disclosure may include any feedstock that includes hydrogen, such as a carbon-containing feedstock, a hydrogen-containing feedstock, and/or water. Illustrative, non-exclusive examples of suitable liquid feedstocks 18 include at least one carbon-containing feedstock such as a hydrocarbon or an alcohol that is liquid at ambient conditions, such as 25° C. and 1 atm. Illustrative, non-exclusive examples of suitable liquid hydrocarbons include diesel, kerosene, gasoline, synthetic liquid fuels, and the like. Additional illustrative, non-exclusive examples of suitable liquid hydrocarbons include oxygenated hydrocarbons, such as acetone, acetic acid, formate, and dimethyl carbonate. Illustrative, non-exclusive examples of gaseous feedstock 18 include carbon-containing feedstocks such as methane, butane, propane, and natural gas and hydrogen-containing feedstocks such as ammonia. Illustrative, non-exclusive examples of suitable alcohols include methanol, ethanol, and polyols, such as ethylene glycol and propylene glycol. While a single feed stream 16 is shown in FIG. 1, it is within the scope of the disclosure that more than one stream 16 may be used and that these streams may contain the same or different feedstocks. When feed stream 16 contains two or more components, such as a feedstock and water, the components may be delivered in the same or different feed streams.

According to an aspect of the present disclosure, feedstock delivery system 22 may be adapted to draw or otherwise receive at least a liquid feedstock from a supply, or source, 112 and to deliver a feed stream 16 containing at least the feedstock for use in at least the hydrogen-producing region of the fuel processing system's hydrogen-producing assembly 12. Supply 112 may include any suitable type and/or number of reservoirs and/or other sources from which one or more feedstocks for the feed stream may be drawn or otherwise received. Illustrative, non-exclusive examples of suitable supplies 112 include tanks, canisters, and other fluid vessels, which may be pressurized or unpressurized. Feedstock delivery system 22 may utilize any suitable delivery mechanism, such as a positive displacement or other suitable pump or mechanism for propelling and pressurizing the feed streams. When one or more pumps are used, the number, type and capacity of the pumps may vary, such as with respect to the desired flow rate of liquid to be pumped thereby, the desired pressure to be provided to the liquid, the composition of the liquid, whether or not the flow rate is intended to be selectively varied, etc.

When the fuel processing assembly is configured to receive water and a feedstock as reactants to produce hydrogen gas and when the feedstock is miscible with water, the feedstock may be, but is not required to be, delivered to the fuel processing assembly in the same feed stream as the water component of feed stream 16, such as shown in FIG. 1 by reference numerals 17 and 18 pointing to the same feed stream 16. For example, when the fuel processing assembly receives a feed stream containing water and a water-soluble alcohol, such as methanol, these components may be premixed and delivered as a single feed stream. As an illustrative, non-exclusive example, a reforming feed stream may contain approximately 25-75 vol % methanol or ethanol or another suitable water-miscible feedstock, and approximately 25-75 vol % water. For feed streams formed (at least substantially) of methanol and water, the streams will typically contain approximately 50-75 vol % methanol and approximately 25-50 vol % water. Feed streams 16 containing ethanol or other water-miscible alcohols will typically contain approximately 25-60 vol % alcohol and approximately 40-75 vol % water. For hydrogen-generating assemblies that utilize steam reforming or autothermal reforming reactions to produce hydrogen gas, an illustrative, non-exclusive example of a feed stream contains 69 vol % methanol and 31 vol % water, although other compositions and liquid feedstocks may be used without departing from the scope of the present disclosure. It is within the scope of the present disclosure that such a feed stream that contains both water and at least one feedstock may be used as the feed stream for hydrogen-producing region 19 and as a combustible fuel stream for a burner or other heating assembly (when present) that is adapted to heat at least the hydrogen-producing region of the fuel processing system, such as to a suitable hydrogen-producing temperature.

Hydrogen-producing assembly 12 includes a hydrogen-producing region 19, in which an output, or reaction product, stream 20 containing hydrogen gas is produced by utilizing any suitable hydrogen-producing mechanism(s) to chemically react the feedstock(s) from the feed stream(s). Output stream 20 includes hydrogen gas as at least a majority component and may additionally or alternatively be referred to as a reformate stream, or reformate gas stream, 20. Output stream 20 may include one or more additional gaseous components, and thereby may be referred to as a mixed gas stream, which contains hydrogen gas as its majority component, and which also contains other gases. The other gases that are typically present in the reformate stream include carbon monoxide, carbon dioxide, methane, steam, and/or unreacted feedstock.

An illustrative, non-exclusive example of a suitable mechanism for producing hydrogen gas in hydrogen-producing region 19 from feed stream(s) 16 delivered by feedstock delivery system 22 is steam reforming, in which a reforming catalyst is used to produce hydrogen gas from at least one feed stream 16 containing a feedstock 18 and water 17. In a steam reforming process, hydrogen-producing region 19 contains a suitable steam reforming catalyst 23, as indicated in dashed lines in FIG. 1. In such an embodiment, in which a steam reforming catalyst is utilized, the fuel processing assembly may be referred to as a steam reformer, hydrogen-producing region 19 may be referred to as a reforming region, and output, or mixed gas, stream 20 may be referred to as a reformate gas stream. As used herein, reforming region 19 refers to any hydrogen-producing region utilizing a hydrogen-producing mechanism, or reaction.

The selection of steam reforming catalyst may affect the operation, or operating, conditions of the hydrogen-producing region, as well as the temperature of the hydrogen-producing assembly. Any suitable type of catalyst may be applied to the reforming reactions, including such illustrative, non-exclusive examples as monolith, pellets, extrudates, spheres, meshes, fibers, mat, and (wall) wash coats. Illustrative, non-exclusive examples of suitable steam reforming catalysts are disclosed in U.S. Pat. No. 7,128,769, the disclosure of which is hereby incorporated by reference.

Another illustrative, non-exclusive example of a suitable hydrogen-producing reaction that may be utilized in hydrogen-producing region 19 is autothermal reforming, in which a suitable autothermal reforming catalyst is used to produce hydrogen gas from water and a feedstock in the presence of air. When autothermal reforming is used, the fuel processing assembly further includes an air delivery assembly 67 that is adapted to deliver an air stream to the hydrogen-producing region, as indicated in dashed lines in FIG. 1. Autothermal hydrogen-producing reactions utilize a primary endothermic reaction that is utilized in conjunction with an exothermic partial oxidation reaction, which generates heat within the hydrogen-producing region upon initiation of the initial hydrogen-producing reaction.

Yet another illustrative, non-exclusive example of a suitable hydrogen-producing reaction that may be utilized in hydrogen-producing region 19 is ammonia thermal decomposition, in which a mixed gas stream including hydrogen gas and nitrogen gas is formed from a feed stream that includes ammonia. Illustrative, non-exclusive examples of ammonia thermal decomposition catalysts according to the present disclosure include ammonia synthesis catalysts and catalysts including transition metals from Group VIII of the Periodic Table.

An additional illustrative, non-exclusive example of a suitable hydrogen-producing reaction that may be utilized in hydrogen-producing region 19 is the steam pre-reforming of higher hydrocarbons. Higher hydrocarbons are defined as those containing at least two carbon atoms in a molecule, such as ethane, propane, butane, etc. The purpose of steam pre-reforming is to break down the carbon-to-carbon chain within the molecules at lower temperature to avoid the coke formation that may occur at traditional methane steam reforming temperatures. The products of steam pre-reforming are methane, hydrogen, and carbon oxides. Illustrative, non-exclusive examples of steam pre-reforming catalysts according to the present disclosure include nickel (Ni), ruthenium (Ru), and/or rhodium (Rh)-based catalysts.

Hydrogen-producing region 19 also may be referred to more generally as a reaction region 19. Additional illustrative, non-exclusive examples of suitable reactions that may be utilized in reaction region 19 include any suitable reaction where a narrow range of temperature control is desired, including any suitable endothermic reaction requiring heat input from heating assembly 60, such as from burner 62 or heater 63, and/or any suitable exothermic reaction requiring heat removal. The temperature for supporting an endothermic reaction should be compatible with the thermally conductive materials used for constructing the reactor. Illustrative, non-exclusive examples of endothermic reactions include steam generation, petroleum refining (FCC, hydrocracking, steam cracking), distillation (reactive distillation, thermal distillation), reactive extraction, and/or synthesis of fine chemicals.

It is further within the scope of the present disclosure that hydrogen-producing region 19 also may be referred to as a thermal exchange region 19. Illustrative, non-exclusive examples of suitable processes that may be utilized within thermal exchange region 19 may include heat recovery, process stream cooling, and/or reactive heat exchange. Reactive heat exchange may reduce the surface area needed for either cooling or heating of process streams and thus reduces the size of the heat exchanger.

It is also within the scope of the present disclosure that hydrogen-producing region 19, reaction region 19, and/or thermal exchange region 19 may be utilized to support the coupling of multi-stage reactions with different thermal requirements. An illustrative, non-exclusive example of multi-stage reactions according to the present disclosure may include the coupling of autothermal reforming of hydrocarbons followed by polishing with steam reforming.

It is also within the scope of the present disclosure that hydrogen-producing region 19 may include a plurality of zones, or portions, and that each of the plurality of zones may be operated under similar operating conditions, such as at the same temperature. Alternatively, at least a portion of the plurality of zones may be operated under different operating conditions, such as at one or more different temperatures. As an illustrative, non-exclusive example, when the feedstock is, or includes, a hydrocarbon, it may be desirable to include two different hydrogen-producing zones, with one zone operating at a lower temperature than the other zone to provide a pre-reforming region. In such an embodiment, the fuel processing system alternatively may be described as including a plurality of hydrogen-producing regions. It is within the scope of the present disclosure that the mechanisms utilized by these hydrogen-producing regions to produce hydrogen gas may be the same. However, it is also within the scope of the present disclosure that the mechanisms utilized by these hydrogen-producing regions to produce hydrogen gas may be different. For example, and as discussed herein, a hydrogen-producing region that utilizes an autothermal reaction to produce hydrogen gas may be followed by a hydrogen-producing region that utilizes a steam reforming reaction to produce hydrogen gas.

At least the hydrogen-producing region 19 of hydrogen-producing assembly 12 is designed to be operated at an elevated temperature when being utilized to produce hydrogen gas. This hydrogen-producing temperature may be achieved and/or maintained in hydrogen-producing region 19 through the use of a heating assembly 60 or other suitable heat source. Hydrogen-producing steam reformers typically operate at temperatures in the range of 200-900° C. Temperatures outside of this range are within the scope of the disclosure. When the feedstock is methanol, the steam reforming reaction will typically operate in a temperature range of approximately 200-500° C. Illustrative subsets of this range include 200-300° C., 200-400° C., 250-350° C., 300-400° C., 350-450° C., 375-425° C., 375-400° C., and 400-450° C. When the feedstock is a hydrocarbon, ethanol, or another alcohol, a temperature range of approximately 400-900° C. will typically be used for the steam reforming reaction. Illustrative subsets of this range include 750-850° C., 725-825° C., 650-750° C., 700-800° C., 700-900° C., 500-800° C., 400-600° C., and 600-800° C.

At least the hydrogen-producing region 19 of hydrogen-producing assembly 12 also may be configured to be operated at an elevated pressure, such as a pressure of at least 30, at least 40, or at least 50 psi. This pressure may be referred to herein as a hydrogen-producing pressure. As illustrative, non-exclusive examples, steam and autothermal reformers are typically operated at such hydrogen-producing pressures as pressures in the range of 40-1000 psi, including pressures in the range of 40-100 psi, 50-150 psi, 50-200 psi, etc. Pressures outside of this range may be used and are within the scope of the present disclosure. For example, in some embodiments, a lower pressure may be sufficient, such as when the hydrogen-producing region is adapted to produce hydrogen gas using a partial oxidation reaction, using an autothermal reforming reaction, using ammonia thermal decomposition, and/or when the fuel processing system does not utilize a pressure-driven separation process to increase the purity of the hydrogen gas produced in the hydrogen-producing region. When the fuel processing system includes a purification, or separation, region, such as described herein, this region also may be designed to operate at an elevated pressure and/or elevated temperature. In some fuel processing assemblies according to the present disclosure, the hydrogen-producing region and/or any associated separation region may be designed to be operated at a comparatively low pressure, such as a pressure that is less than 70 psi, less than 60 psi, less than 50 psi, in the range of 30-50 psi, 30-70 psi, 40-60 psi, etc.

The particular maximum and minimum operating pressures for a particular fuel processing system may vary according to a variety of possible factors. Illustrative, non-exclusive examples of such factors may include, but are not limited to, the hydrogen-producing reaction and/or catalyst utilized in hydrogen-producing region 19, the composition of feed stream 16, the viscosity of the liquid in feed stream 16, the construction of the fuel processing assembly, the pressure and/or temperature requirements of the fuel processing assembly and/or a separation region and/or a fuel cell system downstream from the hydrogen-producing region, the materials of construction of the fuel processing assembly, design choices and tolerances, etc. For example, some fuel processing systems may be designed to maintain an elevated pressure in at least the hydrogen-producing region, and optionally at least one purification region thereof, by utilizing a restrictive orifice or other suitable flow restrictor downstream of the hydrogen-producing region, and optionally downstream of a purification region if it is also desirable to maintain the purification region at an elevated pressure. In some embodiments, the feedstock delivery system provides a feed stream having a pressure sufficient to result in the hydrogen-producing region being pressurized to at least a minimum hydrogen-producing pressure.

The heat required to heat (and/or maintain) at least the hydrogen-producing region 19 of hydrogen-producing assembly 12 to (and/or at) a suitable hydrogen-producing temperature (such as those discussed above), may be provided by a heating assembly, which may form a portion of hydrogen-producing assembly 12. Illustrative, non-exclusive examples of suitable structures for heating assembly 60 include a burner or other combustion-based heater 62 that combusts at least one fuel stream 64 and air to produce heat, and which may accordingly produce at least one heated exhaust stream, or combustion exhaust stream, 66. The transfer of heat from the heating assembly to the optional vaporizing region 69 and the hydrogen-producing region 19 is schematically indicated in FIG. 1 at 81. Fuel stream 64 and air may collectively be referred to as a fuel-air stream 64. As used herein, "fuel-air stream," "fuel and air mixture," and the like refer to a stream of oxygenated fuel and is not limited to including air, per se. The heat exchange between the components of the fuel processing assembly may be enabled via a variety of direct and indirect heating mechanisms. Illustrative, non-exclusive examples of heating assemblies and components thereof that may be used with fuel processing systems according to the present disclosure are disclosed in U.S. Patent Application Publication Nos. 2003/0192251, 2003/0223926, and 2006/0272212, the complete disclosures of which are hereby incorporated by reference. As discussed in more detail herein, it is within the scope of the present disclosure that this heat may be transmitted to at least the components of the hydrogen-producing assembly 12 via any suitable mechanism, including convection, conduction, and/or radiation.

It is also within the scope of the present disclosure that other configurations and types of heating assemblies 60 may be additionally or alternatively utilized. As an illustrative example, a heating assembly 60 may be an electrically powered heating assembly that is adapted to heat at least the hydrogen-producing region of the hydrogen-producing assembly (and optionally a vaporization region 69 and/or a purification region 24, when present) by generating heat using at least one heating element, such as a resistive heating element. Therefore, it is not required that heating assembly 60 receive and combust a combustible fuel stream to heat hydrogen-producing region 19 to a suitable hydrogen-producing temperature.

When one or more of the feedstocks is received from the feedstock delivery system as a liquid stream, such as via one or more pumps associated with the feedstock delivery system, the fuel processing assembly may include a vaporization region 69 in which a liquid portion of the feed stream is converted into a gaseous stream. The heat required for this vaporization may be provided by the heat produced by heating assembly 60. It is also within the scope of the disclosure that hydrogen-producing assembly 12 may be constructed without a vaporization region and/or that the hydrogen-producing assembly is adapted to receive at least one feedstock that is gaseous or that has already been vaporized. Additionally or alternatively, it is within the scope of the present disclosure that hydrogen-producing assembly 12 may be constructed with one or more conduits, including a plurality of generally parallel conduits that are formed within the body of the hydrogen-producing assembly, that each collectively define both a vaporization region 69 and a hydrogen-producing region 19, such as schematically illustrated in dashed lines in FIG. 1 with a combined vaporizing/reforming conduit 70.

In conventional fuel processing assemblies, the components are spaced-apart from each other and separated by open space, such as an internal compartment or chamber within a common housing in which the components are enclosed. These components are interconnected by tubing and associated fittings to establish fluid conduits between the physically separated components. A conventional fuel processing assembly will often also include one or more heat exchangers to enable and regulate heat transfer between various fluid streams within the fuel processing assembly and/or fuel processing system.

In contrast to such conventional fuel processing assemblies, hydrogen-producing assemblies 12 according to the present disclosure include a solid heat transfer mass, or body, 140 that physically interconnects, extends between, and surrounds components of the hydrogen-producing assembly. Heat transfer body 140 may additionally or alternatively be referred to as a heat transfer block with internal passages and cavities that contain components and interconnecting fluid conduits of the hydrogen-producing assembly. As schematically illustrated in FIG. 1, at least the hydrogen-producing region 19, vaporization region 69, and heating assembly 60 of the hydrogen-producing assembly may be contained within the heat transfer body 140. In some embodiments, heat transfer body 140 may additionally or alternatively be referred to as, and/or may include, a monolithic body 143. Additionally or alternatively, a heat transfer body 140 may include, and a monolithic body 143 may be coupled to, one or more end caps 141, as schematically illustrated in FIG. 1. The number, size, thickness, and position of the one or more end caps that may be used with a heat conductive body and/or monolithic body may vary without departing from the scope of the present disclosure.

End caps 141, when present, may include fluid passages that fluidly interconnect two or more fluid conduits that extend through (and are formed within and/or bounded by)

the monolithic body and/or heat transfer body. Such end caps may be referred to herein as end cap manifolds 141. When present, an end cap manifold may include or define fluid passages to and from one or more of the hydrogen-producing region 19 and the optional vaporization region 69, and/or portions thereof. For example, as schematically illustrated in FIG. 1 at 75, a fluid passage may connect the hydrogen-producing region 19 to itself via an end cap manifold 141. For example, a hydrogen-producing region 19 may include more than one portion defined within the monolithic body 140 that are fluidly connected to each other via one or more end cap manifolds. Similarly, as schematically illustrated at 77, a fluid passage may connect the optional vaporization region to itself via an end cap manifold 141, and therefore an optional vaporization region may include more than one portion that are defined within the monolithic body 140 and which are fluidly connected to each other via one or more end cap manifolds. Additionally or alternatively, as schematically illustrated at 79, the hydrogen-producing region 19 may be fluidly coupled to the optional vaporization region 69 via a passage extending through an end cap manifold. Other configurations are also within the scope of the present disclosure. End caps, and/or end cap manifolds, 141 additionally or alternatively may include fluid ports that extend through the end caps, such as to provide a fluid connection with conduits through which fluids are delivered to, or removed from, the monolithic body and/or heat transfer body. In such embodiments, an end cap manifold may be referred to as an end cap inlet manifold or an end cap outlet manifold depending whether fluid is being delivered to or from, respectively, the monolithic body and/or heat transfer body.

As mentioned, hydrogen-producing assemblies 12 according to the present disclosure may additionally include electrically powered heating assemblies, such as electric resistance heaters 63. For example, and as schematically illustrated in FIG. 1, a hydrogen-producing assembly may include one or more electric resistance heaters 63 disposed within one or more heater conduits 65 defined by the monolithic body 143, such as by one or more bores or other openings or passages extending into the body, and/or one or more grooves or channels formed in the body, and/or defined by an end cap manifold of a hydrogen-producing assembly. In such embodiments, an electric resistance heater may be described as a cartridge heater 71 because it is configured to extend into or within a heater conduit 65. Although schematically illustrated in FIG. 1 as including two optional cartridge heaters 71 disposed within the monolithic body, it is within the scope of the present disclosure that no, one, or more than two cartridge heaters may be used. In FIG. 1, a first cartridge heater 71 is schematically illustrated adjacent the hydrogen-producing region 19 schematically illustrating that such a heater may be used to at least temporarily heat the hydrogen-producing region, for example, to within a suitable reforming (or hydrogen-producing) temperature range, such as a suitable steam reforming temperature range. A second cartridge heater 71 is schematically illustrated adjacent the optional vaporization region 69 to schematically illustrate that such a heater may be used to at least temporarily heat the vaporization region, for example, to at least a suitable vaporization temperature, namely, a suitable temperature for vaporizing the fed stream, or any liquid component thereof. In embodiments that include an electric resistance heater, the hydrogen-producing assembly and/or fuel processing system may be configured to deactivate the electric resistance heater in response to the burner generating sufficient heat to maintain the hydrogen-producing region within a reforming temperature range. Additionally or alternatively, the hydrogen-producing assembly and/or fuel processing system may be configured to turn off, or otherwise deactivate the electric resistance heater after a predetermined period of time. As discussed herein, the electric resistance heater may be utilized to efficiently startup a hydrogen-producing assembly according to the present disclosure, for example, in response to a primary power source becoming unavailable to power an energy-consuming device, such as when the hydrogen-producing assembly is a component of a fuel cell system.

As also schematically illustrated in FIG. 1, hydrogen-producing assemblies 12 according to the present disclosure may additionally or alternatively (but are not required to) include an electric resistance heater 63 that generally surrounds at least a portion of the heat transfer body 140, including monolithic body 143, and/or which extends against and/or along a portion (such as an exterior or interior) of the body. In some such embodiments, an electric resistance heater may be described as a wrap, or band, heater 73 because it at least partially, or even completely, encircles the heat transfer body and/or the monolithic body.

Additionally or alternatively, as also schematically illustrated in FIG. 1, hydrogen-producing assemblies 12 according to the present disclosure may utilize a heat exchange arrangement 102 between two or more fluid streams. For example, as schematically indicated in FIG. 1, the one or more feed streams 16 may be pre-heated prior to delivery to the heat transfer body by exhaust stream 66. Additionally or alternatively, the one or more feed streams may be pre-heated by the reformate stream. It is within the scope of the present disclosure that heat exchange arrangement 102 may be disposed external to or within the heat transfer body 140 for pre-heating the one or more feed streams 16 prior to deliver to the hydrogen-producing region and/or the vaporizing region of the hydrogen-producing assembly. Heat exchange arrangement 102, when present, may take any suitable form and may utilize any suitable structure for effective heat exchange of the fluid streams. This heat exchange may include counter-current and/or co-current heat exchange, and the heat transfer between the streams may include conduction and/or other forms of heat transfer. In some embodiments, the heat transfer arrangement, when present, may include at least a pair of bores, or passages, in an extruded or otherwise solid heat transfer body, which in some embodiments may even be passages in heat transfer body 140.

In FIG. 2, illustrative, non-exclusive examples of hydrogen-producing assemblies 12 with heat transfer body 140 are schematically illustrated. As shown, heat transfer body 140 may include internal fluid passages 142 that interconnect cavities, chambers, or conduits, 144 that form, surround, and/or define optional vaporization region 69, hydrogen-producing region 19, and burner 62 of the fuel processing assembly. As mentioned, some embodiments may include (but are not required to include) one or more combined vaporizing/reforming conduits 70, whereas other may include separate vaporization and hydrogen-producing conduits. As shown, burner 62 may be in fluid communication with at least one fluid passage 142 through which air and fuel may be delivered to the burner, and at least one fluid passage through which combustion exhaust 66 may exit body 140. As indicated in dashed lines, the fluid passage(s) through heat transfer body 140 through which the combustion exhaust flows may pass to, around, through, or otherwise proximate the one or more cavities that define the optional vaporization region and the hydrogen-producing region. Also shown in FIG. 2 are at least one fluid passage through which the feed stream(s) may be delivered to the vaporization region (when present) and then the hydrogen-producing region, and at least one fluid passage through which the output stream 20 may flow out of the heat transfer body from the hydrogen-producing region. It is within the scope of the present disclosure that heat transfer body 140 may be free from fittings and/or fluid conduits that interconnect the components of the fuel processing assembly external the heat transfer body 140, although this is not required to all embodiments.

Although schematically illustrated in FIG. 2, the functional regions, or zones, of the hydrogen-producing assembly may each include one or more fluid passages or cavities within the body. The directions of the cavities and fluid passages within the body may vary, such as being co-current, counter-current, and/or cross-current in relation to each other. The fluid paths may have any suitable shape and size, including linear, arcuate, and/or coiled configurations. The length and cross sectional area of the cavities and fluid passages may vary within the scope of the present disclosure. As an illustrative, non-exclusive example, these cross-sectional areas may range from 0.19 to 8,000 square millimeters to accommodate reactions in different flow scales. It is within the scope of the present disclosure that the body may include additional structures for enhancing mixing and/or heat transfer, such as passive mixers (such as baffles, pallets, fins, microtubes, etc.). Illustrative, non-exclusive examples of mixing structures are disclosed in U.S. patent application Ser. No. 12/182,959, the complete disclosure of which is hereby incorporated by reference.

Heat transfer body 140 may be a monolithic structure and/or as mentioned may at least include a monolithic body 143. In such an embodiment, the heat transfer body 140, and/or the monolithic body 143 may be formed without seams, welds, or other seals or interfaces between two or more interconnected and separately formed portions of the heat transfer body and/or monolithic body. These bodies may themselves be interconnected with one or more additional components of the fuel processing assembly, such as end caps, but the bodies are formed as one-piece structures. Alternatively, heat transfer body 140 may be a solid structure that is formed from two or more components that are secured together by any suitable permanent or releasable fastening mechanism. Illustrative, non-exclusive examples of permanent fastening mechanisms include welding, brazing, friction stir welding, and diffusion bonding. Illustrative, non-exclusive examples of releasable fastening mechanisms include the use of releasable fasteners, screws, bands, bolts, joints, tie-rods, and the like that are designed to be repeatedly coupled together, uncoupled, and then recoupled together without destruction of at least the components of the body. When formed from two or more components, these components may have the same or different shapes, sizes, and/or materials of construction.

To facilitate heat transfer from burner 62 (or other heating assembly 60, such as optional electric resistance heaters) to the hydrogen-producing region 19 and optional vaporization region through the material from which heat transfer body 140 and/or monolithic body 143 is formed, heat transfer body 140 and/or monolithic body 143 should be formed from one or more materials having high heat conductivity. Illustrative, non-exclusive examples of such materials include aluminum and its alloys, copper and its alloys, silicon, carbon and its carbide compounds, nitride compounds, and other transition metals in the Periodic Table of the Elements and their alloys. As an illustrative, non-exclusive example, aluminum and its alloys have thermal conductivities that are at least an order of magnitude greater than that of (most) steel alloys. This may correlate to requiring one tenth of the corresponding surface area to achieve the same heat transfer rate as a similar structure formed from a conventional steel alloy. As illustrative, non-exclusive examples, the thermal conductivity of the heat transfer body and/or the monolithic body may be one of at least 50%, at least 100%, at least 200%, at least 400%, at least 800%, and at least 1,600% greater than the thermal conductivity of steel, or a conventional steel alloy. Illustrative, non-exclusive examples of suitable aluminum alloys include 6063 and 6061 alloys, although others may be used.

Due to its thermal conductivity and position surrounding and interconnecting the components of the fuel processing assembly, heat transfer body 140 and/or monolithic body 143 also may be described as being, forming, and/or functioning as, a heat exchanger between the components and fluid streams of the hydrogen-producing assembly. Heat transfer may be affected through the material of the heat transfer body and/or the monolithic body via conduction and/or radiation, as well as via flow of the various fluid streams through the body, and thus via convection. In some embodiments, heat transfer body 140 and/or monolithic body 143 may provide at least a hydrogen-producing region that is maintained at or near isothermal conditions during use of the fuel processing assembly after the fuel processing assembly has been properly started up and heated to a suitable hydrogen-producing temperature. The conductive heat exchange relationship of the functional components, or regions, defined within the heat transfer body 140 and/or monolithic body 143 may reduce thermal gradients within the hydrogen-producing region and/or may otherwise provide for efficient heat transfer between these components, or regions, that are formed with the cavities, voids, or other regions formed within the heat transfer body and/or monolithic body itself.

When choosing the one or more conductive materials from which heat transfer body 140 and/or monolithic body 143 will be formed, consideration should be given to the melting points and oxidation stability of the materials, as well as the expected mechanical stress as the function of reaction temperature, pressure and designed operation time. As discussed, the operating (i.e., hydrogen-producing) temperature of hydrogen-producing region 19 is at least partially dictated by the feedstock from which hydrogen gas is to be produced. One or more of the cavities, or conduits, that define and/or receive the functional regions of the fuel processing assembly (vaporization region, hydrogen-producing region, burner, etc.) and/or one or more of the corresponding fluid passages may include an oxidation resistant coating and/or layer. An illustrative, non-exclusive example of a suitable oxidation resistant coating is an aluminum oxide layer, such as may be applied through an anodizing process. To increase heat transfer within the cavities and/or fluid passages, these portions of the fuel processing assembly may include passive mixing elements therewithin, such as metal shots, meshes, vanes, fins, and the like.

Heat transfer body 140 and/or monolithic body 143 may be formed from any suitable process, with illustrative, non-exclusive examples including extrusion, casting, brazing, welding, stamping, CNC machining, sintering, and automated welding. As an illustrative, non-exclusive example, aluminum is a soft metal with which relatively low cost fabrication techniques, such as extrusion and brazing, may be readily utilized. These processes, as well as the corresponding materials of construction, may reduce the number of individual pieces, assembly time, complexity, and/or manufacturing cost of the fuel processing assembly compared to a conventional fuel processing assembly. Once formed, hydrogen-producing assembly 12 may not need additional handling during integration with the rest of a fuel processing assembly 10 or a corresponding fuel cell system, as is the case with traditional discrete devices.

Alternatively, heat transfer body 140 and/or monolithic body 143 may include or contain loose packing materials made from heat conductive materials, such as aluminum tower packing media of various shapes. These packing materials may serve as the framework for heat conduction, improving heat transfer for endothermic and/or exothermic reactions. Catalyst particles may fill the space or pores created between the loose packing materials. The geometry of such loose packing materials may be selected according to the dimension of hydrogen production region 19 and the catalyst particle size, so that a relatively homogeneous bed packing with desired heat transfer characteristics may be realized. Under this configuration, the conduits or channels formed by the packing materials may be interconnected.

When hydrogen-producing assembly 12 includes a heating assembly 60 in the form of a burner 62, the burner may be a catalytic burner, a non-catalytic burner, or a combination of the two. The burner temperature should be controlled, such as by regulating the air and/or fuel flow to the burner and/or the distribution of air and fuel. An oxidation resistant coating, or sleeve, may be applied to the inner wall of the burner to enhance durability of heat transfer body 140 and/or monolithic body 143. Illustrative, non-exclusive examples of suitable burner types include a cool flame burner assisted by a nozzle, a flameless distributed burner, a porous media burner, a metal fiber mesh burner, and/or a catalytic burner with combustion catalyst coated on the burner's internal wall. For liquid hydrocarbon reforming, or otherwise when higher temperatures are desired and/or when byproduct stream 28 does not have sufficient fuel value to provide sufficient heat, it may be necessary to introduce liquid fuel directly into the burner during the startup as well as during operation. However, this is not required to all burners within the scope of the present disclosure.

Hydrogen-producing assemblies 12 according to the present disclosure may include a heating assembly 60 in the form of a burner 62, as discussed, and may additionally include an electrical heater, such as a heater with an electric heating element in the form of a heat cartridge, band heater, surface heater, etc., and any combinations of the above. For example, this additional heater, which in some embodiments may be referred to as a startup heater, may be utilized during initial heating of the fuel processing assembly, such as during startup, and thereafter turned off after the fuel processing assembly reaches a desired temperature, such as a suitable hydrogen-producing temperature. In some embodiments, the fuel processing assembly may utilize only a single heating assembly during startup and normal (hydrogen-producing) operation. Illustrative, non-exclusive examples of thermally primed hydrogen-producing assemblies and thermally primed hydrogen-producing fuel cell systems are disclosed in U.S. Pat. No. 7,659,019, the disclosure of which is hereby incorporated by reference.

For a fuel processing assembly utilizing methanol and water as feedstocks, an illustrative, non-exclusive method for starting up the fuel processing system is to utilize electric heating (e.g., with a band heater or other suitable resistive heater) and a catalytic combustion catalyst section within the burner chamber. That is, in some embodiments, a hydrogen-producing assembly may include a combustion catalyst 202 disposed within the burner to define an ignition zone 208. When the device reaches a suitable operating (or hydrogen-producing) temperature for the methanol reforming catalyst and above the light-off temperature of at least one combustible component of the burner fuel, methanol/water may be delivered to the burner. Once the burner fuel and air reach the combustion catalyst 202, the burner lights off automatically, assuming a suitable light-off temperature and pressure of the fuel and air and/or a suitable light-off temperature of the combustion catalyst. In addition, as long as the combustion catalyst remains above the light-off temperature of the burner fuel, no other ignition-proving mechanism may be needed, such as according to Sections 1.10 and 1.11 of ANSI/CSA America FC 1-2004).

Another factor to consider in connection with the burner is the placement of the combustion catalyst. Typical flame temperatures of at least 800° C. and less than 1600° C. may be achieved in a porous, catalytic, or open burner. Conventional platinum and palladium or palladium oxide combustion catalysts with a promoter, such as cerium oxide and lanthanum oxide, are catalytically active above room temperature for platinum, and above approximately 250° C. for palladium and palladium oxide, with these temperatures being referred to as the corresponding light-off temperatures for a hydrogen-rich reformate fuel in the presence of these catalysts. Conventional combustion catalysts typically are unstable above 900-1000° C. and thus need to be protected thermally and/or protected by staged air or staged fuel introduction with heat exchange between each stage to avoid overheating the combustion catalyst.

As schematically indicated in FIGS. 1 and 2 at 204, it is within the scope of the present disclosure that a burner, when present in the heat transfer body 140 and/or monolithic body 143, may include a selection of a suitable fuel-air mixing structure that is positioned within a burner chamber, or conduit, of the burner. Such a fuel-air mixing structure may permit ignition of the fuel and air mixture within the ignition zone and allow the combustion thereof to propagate back toward the inlet where air and fuel are first introduced into the burner and subsequently mixed by the fuel-air mixing structure. In this manner, the combustion may be transient within the burner and the combustion may propagate to a combustion region 206 of the burner, which may (but is not required to) be back toward the inlet of the burner. The combustion is then supported within the combustion region by the fuel-air mixing structure. As used herein, the "combustion region" of a burner refers to a region within the burner in which combustion is maintained during steady state, and may (but is not required to) coincide with at least a portion of the fuel-air mixing structure, when present. That is, while ignition of the fuel and air mixture may occur in an ignition zone separate from the combustion region and combustion may propagate from the ignition zone to the combustion region, the combustion region defines the portion of the burner in which combustion is maintained after initial ignition of the fuel and air mixture. In some embodiments, the combustion region fills the entire burner chamber, or conduit, while in other embodiments, the combustion region is a subregion of the burner chamber, or conduit. In some embodiments, the combustion region is generally adjacent the inlet to the burner chamber, or conduit. In some embodiments, the combustion region is spaced apart from, such as spaced above, the inlet to the burner chamber. In some embodiments, the combustion region extends for less than one half of the length of the burner conduit. Other configurations are also within the scope of the present disclosure. In some embodiments, the fuel-air mixing structure may be configured to support flameless combustion in the combustion region.

While combustion is maintained in the combustion region of the burner, and in some embodiments supported by a fuel-air mixing structure, heat is conducted through the heat transfer body and/or the monolithic body to the hydrogen-producing region and/or optional vaporization region of the hydrogen-producing assembly. Accordingly, the exhaust gases are cooled as they travel through the burner. Proper fuel and air management may maintain the exhaust gas temperature below a damage threshold of the combustion catalyst, for example, when the combustion catalyst is disposed at or adjacent the exit, or outlet, of the burner. Further optimization of the burner may permit efficient heat transfer from the combustion gases to the hydrogen-producing region and the optional vaporization region with the exit temperature of the gases just above the target equilibrium reforming temperature, an illustrative, non-exclusive example of which is 250-315° C. for a high thermal efficiency system.

Illustrative, non-exclusive examples of suitable fuel-air mixing structure that may be incorporated into a burner include (but are not limited to) one or more of porous foams, monolithic blocks, packed pellets, balls, pall rings, saddle rings, cross-partition rings, Raschig rings, Intalox saddles, cascade rings, Berl saddles, structured packing, screens or bundles of fine tubing or fiber, any of which may be made of metal and/or ceramic materials that are structurally stable at desired operating temperatures. In some embodiments, the fuel-air mixing structure may extend between the combustion catalyst and the combustion region. Additionally or alternatively, the fuel-air mixing structure may extend between the combustion catalyst and the burner inlet. Additionally or alternatively, the fuel-air mixing structure may extend from adjacent the burner, or exhaust, outlet to adjacent the burner, or fuel-air, inlet. Additionally or alternatively, the fuel-air mixing structure may extend adjacent the burner outlet and adjacent the burner inlet. Additionally or alternatively, the fuel-air mixing structure may be disposed in two or more spaced-apart regions of the burner. Additionally or alternatively, the fuel-air mixing structure may be disposed only in the combustion region of the burner.

In some embodiments, the combustion catalyst is disposed on a portion of the fuel-air mixing structure, when present, adjacent the burner, or exhaust, outlet. Additionally or alternatively, the combustion catalyst may be disposed only on a portion of the fuel-air mixing structure adjacent the burner, or exhaust, outlet. In some such embodiments, the portion of the fuel-air mixing structure on which the combustion catalyst is disposed may extend for less than one eighth or for less than one fourth of the length of the burner, the burner conduit, the burner chamber, the monolithic body, and/or the heat transfer body. Additionally or alternatively, the combustion catalyst may be disposed in spaced-apart regions of the burner. Additionally or alternatively, the combustion catalyst may be disposed on a wall of the burner chamber, or conduit, and not be disposed on the fuel-air mixing structure, even when present. Additionally or alternatively, the combustion catalyst may be disposed both on a wall of the burner chamber, or conduit, as well as on the fuel-air mixing structure. The distribution and positioning of the combustion catalyst may vary according to such factors as the combustion catalyst itself, the reforming temperatures being utilized, the thermal conductivity of the heat transfer body/combustion catalyst interface, and the desired heat flux at specific locations. Alternatively, the location, form, and/or composition of the catalyst may be optimized to reduce undesirable emissions to the environment. In some embodiments, the combustion catalyst may be positioned along the entire length of the burner, burner chamber, or burner conduit.

When utilizing a porous media as a fuel-air mixing structure, selection of too small a pore size may prevent the combustion from traveling toward the desired combustion region, thereby permitting undesirable long-term combustion of the mixture in the ignition zone. The result of a small pore configuration is thus likely to include one or more of poor thermal integration and heat transfer, excess thermal losses in the combustion exhaust, poor emissions due to incomplete combustion and residence time, and limited life of the combustion catalyst due to high temperatures without adequate heat transfer in the combustion catalyst zone.

As schematically indicated in FIG. 2, hydrogen-producing assemblies 12 according to the present disclosure may include one or more screens, or other retaining structure, 104 positioned within or adjacent to the various conduits or regions defined by the heat transfer body 140. When present, this structure may retain media positioned within the conduits, such as (but not limited to) reforming catalyst within the hydrogen-producing region, heat transfer material within the optional vaporization region, fuel-air mixing structure within the burner conduit, and/or combustion catalyst within the burner conduit.

As shown in FIG. 3, hydrogen-producing assembly 12 may further include a containment vessel, or housing, 150 into which heat transfer body 140 is positioned. Containment vessel 150 may additionally or alternatively be referred to as an outer housing. Vessel 150 may be formed from metallic and/or non-metallic materials and may define a gas-tight enclosure that includes one or more defined inlets and outlets 152 for fluids to enter and be removed from the vessel. For example, the vessel may include an exhaust port 154 through which at least combustion exhaust and/or any leaked gases may be removed from the vessel. The vessel may include insulation 156 within the vessel's walls and/or between the internal wall of the vessel and the exterior of the body. Vessel 150 may be pressurized or unpressurized. When pressurized, it may be pressurized to provide support to the body, such as by being pressurized to a pressure in the range of 0.01 to 2, 3, 5, or 10 times the pressure of the hydrogen-producing region. It is within the scope of the present disclosure that other pressures, including pressures that are below, within, or above these illustrative ranges, may be utilized without departing from the scope of the present disclosure.

FIG. 4 somewhat less schematically illustrates illustrative, non-exclusive examples of hydrogen-producing assemblies 12 according to the present disclosure that include a heat transfer body 140 including a monolithic body 143 and two end cap manifolds 141. More specifically, FIG. 4 schematically illustrates a monolithic body 143 in cross-section together with the various regions defined therein, together with the two end cap manifolds and the fluid flow paths, or conduits, through the monolithic body and the end cap manifolds. As illustrated, the monolithic body 143 may define a reforming conduit 210 and a burner conduit 212, each extending through the monolithic body. Reforming conduit 210 may be described as defining or including hydrogen-producing region 19 and burner conduit 212 may be described as defining or including burner 62 of hydrogen producing assembly 12.

Monolithic body 143 may further define a feed inlet 214 to the reforming conduit for receiving a feed stream 16 into the reforming conduit, and a reformate outlet 216 from the reforming conduit for delivering the reformate gas stream 20 downstream of the hydrogen-producing region, with the associated flow illustrated in dashed lines in FIG. 4. Monolithic body 143 may further define a fuel-air inlet 218 to the burner conduit for receiving a fuel-air stream 64 into the burner conduit, and an exhaust outlet 220 from the burner conduit for delivering exhaust stream 66 from the burner conduit.

A reforming catalyst 23 is disposed within the reforming conduit and is configured to catalyze production of reformate gas stream 20 from feed stream 16 via an endothermic reaction within a reforming temperature range. In FIG. 4, a fuel-air mixing structure 204 is shown disposed within the burner conduit and configured to support combustion of the fuel-air stream in a combustion region of the burner conduit, generally adjacent fuel-air inlet 218. As discussed herein and as schematically illustrated in FIG. 4, fuel-air mixing structure 204 may be disposed in various configurations within the burner conduit. For example, as illustrated in solid lines in the left optionally illustrated portion of the burner conduit, the fuel-air mixing structure may extend for a majority of the length of the burner conduit. Additionally or alternatively, as illustrated in solid lines in the right optionally illustrated portion of the burner conduit, the fuel-air mixing structure may extend only adjacent the exhaust outlet. Additionally or alternatively, as illustrated in dashed lines in the left optionally illustrated portion of the burner conduit, together with the solid lines, the fuel-air mixing structure may extend the entire length of the burner conduit, or from the fuel-air inlet to the exhaust outlet. Additionally or alternatively, as illustrated in dashed lines in the right optionally illustrated portion of the burner conduit, the fuel-air mixing structure may extend generally adjacent the fuel-air inlet. Other configurations are also within the scope of the present disclosure, and FIG. 4 is intended to schematically illustrate illustrative, non-exclusive, and non-exhaustive, examples of configurations of fuel-air mixing structures that may be disposed within a burner conduit of a monolithic body according to the present disclosure.

Beyond the air-fuel mixing zone, the burner chamber may include one or more passive mixing elements to enhance the convective heat transport from combustion exhaust to the endothermic region of the reforming region and/or vaporizing region. Illustrative, non-exclusive examples of suitable passive mixing elements include bluff bodies, turbulators, vanes, fans, blocks, and the like. When present, the mixing elements may be formed from oxidation-resistant materials or materials with oxidation-resistant coatings.

In the illustrative, non-exclusive example shown in FIG. 4, combustion catalyst 202 is disposed within the burner conduit and is configured to catalyze ignition of fuel-air stream 64 via an exothermic reaction. As discussed herein and as schematically illustrated in FIG. 4, combustion catalyst 202 may be disposed in various configurations within burner conduit 218. For example, as schematically indicated with a solid lead line, combustion catalyst 202 may be disposed on a burner conduit wall 222, such as on a portion of the burner conduit wall generally adjacent the exhaust outlet. Additionally or alternatively, as schematically indicated with dashed lead lines, combustion catalyst 202 may be disposed on the entirety of the burner conduit wall and/or on a portion of, or all of, the fuel-air mixing structure.

Accordingly, monolithic body 143 may be constructed to conduct heat generated by the exothermic reaction of the combustion of the fuel-air stream in a combustion region of the burner conduit from the burner conduit to the reforming conduit to maintain the reforming catalyst within the reforming temperature range.

In some embodiments, as illustrated with solid lines in FIG. 4, a heat transfer body 140, and/or a monolithic body thereof, may include a reforming conduit 210 and a burner conduit 212, with delivery of fuel-air stream 64 to the burner conduit and delivery of feed stream 16 to the reforming conduit via a first end cap manifold, or end cap inlet manifold, 141. The flow of the fuel-air stream and the feed stream may therefore be co-current, and the respective reformate gas stream and exhaust stream may exit the heat transfer body via a second end cap manifold, or end cap outlet manifold, 141. Additionally or alternatively, a similarly configured heat transfer body may utilize counter-current fluid flow, in which the fuel-air stream enters and the reformate gas stream exits the monolithic body via a first end cap manifold, and in which the exhaust stream exits and the feed stream enters the monolithic body via a second end cap manifold. Additionally or alternatively, one or both of the reforming conduit and the burner conduit may include more than one portion that extends the length of the monolithic body, with the respective portions being fluidly coupled via an end cap manifold.

As illustrated in dashed lines in FIG. 4, a heat transfer body 140 and/or a monolithic body 143 thereof may (but is not required to) further define a vaporizing conduit 224 that defines, or includes, a vaporization region 69, and which extends through the monolithic body adjacent the burner conduit. In such an embodiment, the monolithic body further defines a vaporizer inlet 226 to the vaporizing conduit for receiving feed stream 16 into the vaporizing conduit, and a vaporizer outlet 228 for delivering the feed stream to the reforming conduit via an end cap manifold. Accordingly, in such an embodiment, one of the fluid flow through the vaporizing conduit and the fluid flow through the reforming conduit may be co-current with the fluid flow through the burner conduit, while the other of the fluid flow through the vaporizing conduit and the fluid flow through the reforming conduit is counter-current to the fluid flow through the burner conduit. As an illustrative, non-exclusive example, the fluid flow through vaporizing conduit 224, co-current with the fluid flow through the burner through an end cap-manifold, and then through reforming conduit 210, counter-current to the fluid flow through the burner, is illustrated in dash-dot lines in FIG. 4. Additionally or alternatively, similar to the reforming conduit and the burner conduit discussed above, the vaporizing conduit may include more than one portion that extends the length of the monolithic body, with the respective portions being fluidly coupled via an end cap manifold.

As also illustrated in dashed lines in FIG. 4, a monolithic body 143 may (but is not required to) further define one or more exhaust conduits 230 that extend through the monolithic body adjacent one or both of the reforming conduit and the vaporizing conduit, when present. When present, the one or more exhaust conduits are in fluid communication with exhaust outlet 220 from the burner conduit. In such an embodiment, the monolithic body further defines a hot-exhaust inlet 232 to the exhaust conduit for receiving exhaust stream 66 from the burner conduit and via an end cap manifold, and a cooled-exhaust outlet 234 from the exhaust conduit for delivering the exhaust stream from the monolithic body, for example, via an end cap manifold. Accordingly, a monolithic body 143 according to the present disclosure may be constructed to conduct heat from the exhaust stream in the one or more exhaust conduits to the reforming conduit to maintain the reforming catalyst within the reforming temperature range and/or to the vaporizing conduit to vaporize liquid portions of feed stream 16.

The illustrative, non-exclusive examples of monolithic body 143 illustrated in FIG. 4 may be described as defining conduits that extend longitudinally through the monolithic body and/or that are parallel to each other. Additionally or alternatively, one or more of each of a reforming conduit 210, a vaporizing conduit 224, and a combined vaporizing/reforming conduit 70 may extend longitudinally through the monolithic body in a concentric pattern relative to the burner conduit. For example, the burner conduit may extend along a central longitudinal axis of the monolithic body with one or more of each of a reforming conduit, or portions thereof, a vaporizing conduit, or portions thereof, and a combined vaporizing/reforming conduit 70 extending longitudinally through the monolithic body and radially spaced from the burner conduit. Other configurations are also within the scope of the present disclosure.

One or more of a burner conduit, a reforming conduit, a vaporizing conduit, and a combined vaporizing/reforming conduit may be lined, or coated, with any suitable material, for example to enhance the durability of the monolithic body and/or to modify the heat transfer to and/or from the conduit. Additionally or alternatively, one or more of a hydrogen-producing region, a burner, and a vaporization region may be constructed as an insert that is positioned within the respective conduit of the monolithic body. None of these configurations are required of hydrogen-producing assemblies 12 according to the present disclosure, but they are collectively and schematically illustrated in FIG. 4 at 240 in dashed lines.

In examples of hydrogen-producing assemblies 12 that include a burner conduit and one or more combined vaporizing/reforming conduits 70, the monolithic body may be described as defining a feed inlet 214 to each of the combined vaporizing/reforming conduits 70, and a reformate outlet 216 from each of the combined vaporizing/reforming conduits for delivering the reformate gas stream 20 downstream of the hydrogen-producing region, with the associated flow illustrated in dashed lines in FIG. 4. In some such embodiments, and as illustrated in FIG. 4, the flow of the feed stream 16 and the reformate stream 20 through each of the combined vaporizing/reforming conduits may be in the same direction as the flow of the fuel-air stream 64 and the exhaust stream 66 through the burner conduit 212. Such an embodiment may be described as having co-current flow of fluids. Alternatively, in some embodiments, the flow of the feed stream and the reformate stream through each of the combined vaporizing/reforming conduits may be in the opposite direction of the flow of the fuel-air stream and the exhaust stream through the burner conduit. Such an embodiment may be described as having counter-current flow of fluids. Additionally or alternatively, a hydrogen-producing assembly may be configured so that one or more combined vaporizing/reforming conduits have a co-current flow arrangement with the burner conduit, and one or more combined vaporizing/reforming conduits have a counter-current flow arrangement with the burner conduit. Other configurations are also within the scope of the present disclosure.

FIGS. 5-12 schematically illustrate cross-sections of illustrative, non-exclusive examples of heat transfer bodies 140, and/or optionally monolithic bodies 143, according to the present disclosure, each representation including a burner conduit 212 extending along a central longitudinal axis of the respective monolithic body. The conduits radially spaced from the burner conduit may be one or more of a reforming conduit, a portion of a reforming conduit, a vaporizing conduit, a portion of a vaporizing conduit, a combined vaporizing/reforming conduit, and/or a portion of a combined vaporizing/reforming conduit. Accordingly, in FIGS. 5-8, the conduits are collectively indicated as conduits 144. The heat transfer bodies of FIGS. 5-8 respectively include one to four conduits 144 that are separate and distinct from the respective central burner conduit 212. Accordingly, as an illustrative, non-exclusive example with reference to FIG. 5, the illustrated heat transfer body may define a single reforming conduit that is spaced radially from the central burner conduit. Such a configuration of a heat transfer body may not include a vaporizing conduit, or alternatively, the illustrated conduit 144 of FIG. 5 may define a combined vaporizing/reforming conduit, in that a portion of the illustrated conduit includes a vaporization region and another portion of the conduit includes a hydrogen-producing region, as discussed herein.

As another illustrative, non-exclusive example with reference to FIG. 6, the illustrated heat transfer body may define a first reformer-conduit portion and a second reformer-conduit portion that are spaced radially from the central burner conduit. Alternatively, the illustrated heat transfer body may define a vaporizing conduit and a reforming conduit. Additionally or alternatively, one or both of the illustrated conduits 144 may define a combined vaporizing/reforming conduit. FIGS. 7 and 8 respectively illustrate heat transfer bodies that define three and four conduits 144 radially spaced from the central burner conduit, with the conduits 144 defining one or more of a reforming conduit, a portion of a reforming conduit, a vaporizing conduit, a portion of a vaporizing conduit, a combined vaporizer and reforming conduit, and/or a portion of a vaporizing, reforming conduit.

As another illustrative, non-exclusive example with reference to FIG. 9, the illustrated heat transfer body (which optionally may be a monolithic body 143) may define conduits 144, one of which may be a burner conduit, in a linear, non-concentric pattern. The longitudinal axes of the three conduits 144 are generally co-planar; however, other configurations are also within the scope of the present disclosure.

FIG. 10 illustrates yet another illustrative, non-exclusive example of a heat transfer body 140, which also optionally may be a monolithic body 143. The example of FIG. 10 includes four conduits 144, including a central conduit 144. The conduits of the example of FIG. 10 may be described as being in a triangular arrangement with one or more of a reforming conduit, a portion of a reforming conduit, a vaporizing conduit, a portion of a vaporizing conduit, a combined vaporizing/reforming conduit, and/or a portion of a vaporizing/reforming conduit spaced concentrically from a central burner conduit; however, other configurations are also within the scope of the present disclosure.

FIG. 11 illustrates another illustrative, non-exclusive example of a suitable cross-section of a heat transfer body 140 according to the present disclosure, with heat transfer body 140 optionally being a monolithic body 143. In the example of FIG. 11, twenty-eight conduits 144 are radially and concentrically spaced about a central burner conduit 212. The heat transfer body of the example of FIG. 11 also includes a plurality of optional heat transfer fins 213 extending into the burner conduit, and which when present may further facilitate the transfer of heat from the burner conduit through the heat transfer body to the various other conduits 144, such as may include vaporizing region(s) and hydrogen-producing regions(s). As an illustrative, non-exclusive example of a heat transfer body according to FIG. 11, an outer diameter of approximately 13 cm, an internal diameter of the burner conduit 212 of approximately 7.6 cm, a radial length of approximately 2 cm for each of the outer conduits 144, an inner width of approximately 0.5 cm for each of the outer conduits 144, and an outer width of approximately 0.8 cm each of the outer conduits 144 may be well-suited for a 5 kW fuel cell stack when an extrusion of approximately 20 inches (50 cm) is used for the heat transfer body. Other sizes and configuration are also within the scope of the present disclosure, including sizes that are larger or smaller than the illustrative, non-exclusive example described above and/or which include a greater or a fewer number of spaced conduits 144.

Yet another illustrative, non-exclusive example of a suitable cross-section of a heat transfer body 140, and optionally a monolithic body 143, according to the present disclosure is illustrated in FIG. 12. In this example, a generally rectangular central burner conduit 212 extends through the heat transfer body between two linear arrays of fourteen conduits 144, for a total of twenty-eight conduits separate and apart from the burner conduit. As an illustrative, non-exclusive example of a heat transfer body according to FIG. 12, the outer dimensions of the heat transfer body may be approximately 9.2 cm by 21.6 cm, the rectangular burner conduit may be approximately 2.6 cm by 19.5 cm, and each of the outer conduits 144 may be approximately 1.0 cm by 1.8 cm, for a 5 kW fuel cell stack when an extrusion of approximately 50 cm is used for the heat transfer body. Other sizes and configurations are also within the scope of the present disclosure, including sizes that are larger or smaller than the illustrative, non-exclusive example described above and/or which include a greater or a fewer number of spaced conduits 144.

The heat transfer body of FIG. 12 includes two side portions 106 that may be welded together to form a single monolithic body 143; however, as discussed herein, heat transfer bodies according to the present disclosure may be constructed of any number of portions, including a single portion, 2, 3, 4, 5, 10, 1-5, 1-10, 5-10, or more portions, to form a monolithic body and/or a heat transfer body with portions secured together in a non-permanent arrangement.

As discussed, various sizes, shapes, and configurations of heat transfer bodies and monolithic bodies are within the scope of the present disclosure, and the present disclosure is not limited to the examples illustrated in FIGS. 5-12. The selection of a particular configuration may be based on a variety of factors, such as (but not limited to) the desired or required rating (e.g., rate of hydrogen production) of a hydrogen-producing assembly and/or the desired rating (e.g., rate of production of electrical output) of an associated fuel cell stack. As illustrative, non-exclusive examples, the various monolithic bodies and hydrogen-producing assemblies may be configured for production of hydrogen to satisfy the hydrogen gas demands of a proton exchange membrane (PEM, or solid polymer) fuel stack with ratings of 0.25, 0.5, 0.75, 1, 5, 10, 0.25-0.75, 0.5-1.5, 0.25-10, 1-10, or 5-10 kilowatts. Other ratings are also within the scope of the present disclosure including ratings less than and greater than the enumerated values and ranges herein.

Additionally or alternatively, the size and shape of conduits 144 may be selected as a function of the size of media to be disposed therein (e.g., catalyst in the hydrogen-producing region, thermally conductive matter in the vaporization region, combustion catalyst in the burner conduit, fuel-air mixing structure in the burner conduit, etc.), and other factors. As an illustrative, non-exclusive example, when the entire surface of the conduit is heated, the size of reforming conduits and/or combined reforming/vaporizing conduits may be selected such that they have a characteristic dimension that is less than or equal to ten times the diameter of the particles (e.g., reforming catalyst, heat transfer matter, etc.) disposed, or to be disposed, therein. This may include characteristic dimensions that are less than nine times, less than eight times, less than seven times, less than six times, less than five times, less than four times, less than three times, or less than two times the diameter of the particles disposed therein, though characteristic dimensions that are greater than ten times the diameter of the particles disposed therein are also within the scope of the present disclosure. Illustrative, non-exclusive examples of characteristic dimensions according to the present disclosure may include any suitable dimension of conduit 144. This may include any suitable diameter, radius, width, height, depth, and/or length and, when conduit 144 includes or contains a porous monolith such as a porous ceramic or metallic foam, may include a characteristic pore diameter of the porous monolith.

An illustrative, non-exclusive example of such a characteristic conduit dimension according to the present disclosure that is six times the characteristic particle dimension includes ⅜ of an inch (approximately 1 cm) when the conduit is packed with highly endothermic 1/16 inch (0.16 cm) diameter methanol steam reforming catalyst. Another illustrative, non-exclusive example of such a characteristic conduit dimension according to the present disclosure that is six times the characteristic particle dimension includes ⅜ of an inch (1 cm) when packed with 1/16 inch (0.16 cm) diameter aluminum shot to form a vaporization section with or without contact to the reforming section.

Yet another illustrative, non-exclusive example of such a characteristic conduit dimension that is 1.5 times the characteristic particle dimension includes ⅜ of an inch (1 cm) when packed with ¼ inch (0.64 cm) diameter aluminum shot to form a vaporization section external to the reformer as shown in FIG. 21 at 102. Yet another illustrative, non-exclusive example of such a characteristic conduit dimension that is 1.6 times the characteristic particle dimension includes 1 inch (2.54 cm) when packed with 1.6 cm ceramic spheres in the burner combustion and exhaust heat transfer sections. Other sizes are also within the scope of the present disclosure (including sizes that are less than or greater than ⅜ of an inch (1 cm)). Conversely, the size of the particles disposed in conduits may be selected based on the size of the conduits.

Additionally or alternatively, the size and spacing of the various conduits 144 may be selected as a function one or more of the conductive properties of the material used to construct the monolithic body, the desired temperature of the vaporizing region and/or the hydrogen-producing region, the type and temperature range of the burner, and other factors.

Additional factors that may be (but are not required to be) used to select an appropriate configuration (e.g., size and material selection) of a heat transfer body according to the present disclosure include the internal pressure and the temperature that will be present in the various conduits during use of the hydrogen-producing assembly to produce hydrogen gas, for example, depending on the particular reforming process selected.

The illustrated heat transfer bodies of FIGS. 5-12 may be particularly well-suited for being extruded, for example, of aluminum or another soft metal to form a monolithic body. Accordingly, a desired rating (e.g., rating of hydrogen production) of a hydrogen-producing assembly may be selected simply by extruding a predetermined length of the monolithic body. That is, for a given cross-sectional size of a monolithic body, a longer extrusion of the monolithic body results in larger hydrogen-producing regions and therefore in a higher rating of hydrogen production. Stated differently, the illustrative, non-exclusive examples of heat transfer bodies illustrated in FIGS. 5-12 are well-suited for scalability by a manufacturer of hydrogen-producing assemblies and fuel processing systems according to the present disclosure.

Configurations of heat transfer bodies 140, and optionally of monolithic bodies 143, and corresponding conduits 144 other than shown in FIGS. 5-12 are also within the scope of the present disclosure, and heat transfer bodies 140 are not limited to including one to four or twenty-eight conduits, or conduit portions, 144 in addition to a burner conduit. Illustrative, non-exclusive ranges of numbers of conduits 144 include (but are not limited to) 1-50, 1-30, 1-20, 1-10, 1-5, 10-50, 20-50, and 30-50. Other numbers of conduits are within the scope of the present disclosure, and the present disclosure is not limited to the ranges enumerated herein. Moreover, and as discussed herein, end caps, or end plates, may be connected to the heat transfer body and may define fluid flow passages and/or manifolds that interconnect two or more of conduits 144.

Turning now to FIGS. 13-32, illustrative, non-exclusive examples of hydrogen-producing assemblies 12 according to the present disclosure and various component parts thereof are illustrated. Where appropriate, the reference numerals from the schematic illustrations of FIGS. 1-12 are used to designate corresponding parts of hydrogen-producing assemblies 12 according to the present disclosure. However, the examples of FIGS. 13-32 are non-exclusive and do not limit the present disclosure to the illustrated embodiments. That is, neither hydrogen-producing assemblies nor various component parts thereof are limited to the specific embodiments disclosed and illustrated in FIGS. 13-32, and hydrogen-producing assemblies according to the present disclosure may incorporate any number of the various aspects, configurations, characteristics, properties, etc. illustrated and described with respect to the embodiments of FIGS. 13-32, of FIGS. 1-12, as well as variations thereof and without requiring the inclusion of all such aspects, configurations, characteristics, properties, etc. For the purpose of brevity, each previously discussed component part, or variant thereof, may not be discussed again with respect to FIGS. 13-32; however, it is within the scope of the present disclosure that the previously discussed features, materials, variants, etc. may be utilized with the illustrated embodiments of FIGS. 13-32. Similarly, it is also within the scope of the present disclosure that all of the component parts, and portions thereof, that are illustrated in FIGS. 13-32 are not required to all embodiments according to the present disclosure.

The following illustrative, non-exclusive examples will discuss hydrogen-producing assemblies 12 according to the present disclosure utilized to produce hydrogen gas via a steam reforming reaction of methanol and water to provide sufficient hydrogen gas to meet the hydrogen demands of a proton exchange membrane (PEM, or solid polymer) fuel cell stack. However, it is within the scope of the present disclosure that the fuel processing assemblies may be used to supply a greater amount of hydrogen gas, utilize a different hydrogen-producing reaction, and/or be used with other forms of fuel cell stacks or other devices that have a demand for hydrogen gas. Similarly, it is within the scope of the present disclosure that the hydrogen-producing assemblies described herein may be utilized for other endothermic reactions that require an exothermic heat source. The following discussion will describe heat transfer body 140 as being formed from aluminum, but it is within the scope of the present disclosure that any of the above-discussed materials may be utilized, as appropriate. Furthermore, the following discussion will describe heat transfer body 140 as being a monolithic body 143, but this construction is not required for all such embodiments.

An illustrative, non-exclusive example of a hydrogen-producing assembly 12 with a heat transfer body 140 according to the present disclosure is shown in FIG. 13, and is indicated generally at 300. As illustrated, the heat transfer body includes a monolithic body 143 that may be formed by aluminum extrusion. Monolithic body 143 includes a center burner chamber, or conduit, 212 and four side chambers, or conduits, 144. Accordingly, hydrogen-producing assembly 300 may be described as an example of a hydrogen-producing assembly having a monolithic body with a cross-section generally corresponding to that illustrated in FIG. 8, albeit with differently shaped conduits 144. The feedstock(s), which also may be referred to as reactant(s), is (are) introduced to one of the side chambers, as indicated by the feed stream 16, which can serve as the vaporization region 69 for liquid components (such as a methanol water mixture) or as a preheat chamber for gas components. While not required to all embodiments, it is within the scope of the present disclosure that this chamber (and/or any other vaporization region 69) may be filled with, or otherwise contain, particulate or other suitable thermally conductive matter to enhance heat transfer. Illustrative, non-exclusive examples of suitable thermally conductive matter include wire cuts, pellets, extrudates, and beads. This optional thermally conductive matter is schematically illustrated at 169 in FIGS. 1-2 and 13.

When present in such a chamber or other vaporization region, this thermally conductive matter may be formed from any suitable thermally conductive metal or other material, and it is within the scope of the present disclosure that the thermally conductive matter may be formed from the same material as heat transfer body 140 and/or monolithic body 143. Illustrative, non-exclusive examples of suitable materials include aluminum, stainless steel, and ceramics. The thermally conductive matter should permit fluid flow through the chamber or other vaporization region, while also increasing heat transfer in this chamber or vaporization region. The particulate or other matter may act as nucleation sites for inducing smooth boiling of the feedstock(s) within the chamber and/or suppress local overheating and uncontrolled (explosive, violent, or unstable) boiling and vaporization. This may result in less, or reduced, pressure fluctuations within the chamber (or vaporization region), compared to if such thermally conductive matter was not present therein.

The reactant(s) then flow(s) sequentially to the other three chambers, which may contain a steam reforming catalyst 23 of any suitable form, including wash-coated catalyst and/or solid catalyst that fills, or at least partially fills, the chambers. The side conduits may be hermetized with top and bottom end cap manifolds 141, which are designed to form plumbing connections and interconnections between the chambers, as discussed herein. A reformate gas stream is produced and exits the hydrogen-producing assembly, as indicated at 20.

The center chamber receives a fuel-air stream 64 and serves as the burner 62 that supplies the heat essential for vaporization and the endothermic hydrogen-producing reaction. An exhaust stream 66 exits the heat transfer body and may be vented to the ambient environment or alternatively be used in other aspects of fuel processing systems, fuel cell systems, and the like, for example, to heat components thereof. In this embodiment, gas combustibles are ideal candidates for the burner fuel, although burner 62 may additionally or alternatively utilize liquid combustibles as its fuel. Specifically, in a fuel processing system, an ideal fuel is the byproduct stream from a hydrogen purification unit or other separation assembly and/or the anode exhaust gas from a reformate-tolerant PEM fuel cell stack. The center burner conduit may be filled with a fuel-air mixing structure, as discussed herein, to enhance fuel and air mixing and heat transfer to the body. Alternatively, the center burner conduit may be partially or completely empty, such as when additional heat transfer and/or fuel/air mixing is not required and/or when it is desirable to reduce pressure drop within the burner.

As schematically illustrated in FIG. 13 at 102, the conduit that delivers feed stream 16 to the monolithic body and the conduit that delivers the reformate gas stream 20 downstream of the monolithic body may be in a heat exchange arrangement. As an illustrative, non-exclusive example, these conduits may simply be positioned adjacent to each other and/or secured (e.g., welded) to each other along a portion of their respective lengths. Other arrangements and configurations are also within the scope of the present disclosure.

Another illustrative, non-exclusive example of a hydrogen-producing assembly 12 with a heat transfer body 140 according to the present disclosure is illustrated in cross-section in FIG. 14 and is generally indicated at 600. Hydrogen-producing assembly 600, like hydrogen-producing assembly 300 of FIG. 13, also includes a monolithic body 143 generally corresponding to the cross-section illustrated in FIG. 8. However, hydrogen-producing assembly 600 includes four combined vaporizing/reforming conduits 70 spaced around a central burner conduit 212. The flow of the fuel-air stream 64 through the burner conduit and the feed stream 16 and reformate stream 20 through the combined vaporizing/reforming conduits 70 are co-current. That is, the feed stream and the air-fuel stream are delivered to the respective conduits of the monolithic body via an end cap inlet manifold 141, and the reformate stream 20 and the exhaust stream 66 exit their respective conduits of the monolithic body via an end cap outlet manifold 141. Furthermore, as indicated in FIG. 14, hydrogen-producing assembly 600 includes a heat exchange arrangement 102, in which the feed stream 16 is preheated by the reformate stream prior to being delivered to the monolithic body.

In FIG. 14, the end cap manifolds are schematically illustrated and include passages extending therethrough for appropriate delivery of fluid streams to and from the various conduits defined by the heat transfer body. While the exhaust stream 66 is schematically indicated as exhausting to atmosphere, it is within the scope of the present disclosure that the end cap outlet manifold is configured to deliver the exhaust stream to a fluid line, or pipe, for use elsewhere in a fuel processing system according to the present disclosure. Such configurations are within the scope of the other embodiments illustrated and discussed herein, as well.

Another illustrative, non-exclusive example of a hydrogen-producing assembly 12 according to the present disclosure is illustrated in FIGS. 15-17, and is indicated generally at 400. Hydrogen-producing assembly 400 includes a heat transfer body 140 that comprises a monolithic body 143. That is, heat transfer body 140 does not include end cap manifolds. The monolithic body of hydrogen-producing assembly 400 takes the form of a rectangular aluminum block, which can be easily machined to allow fast prototyping or cast for large quantity production. As illustrated in FIG. 10, a fuel stream 59 and an air stream 61 are combined to form fuel-air stream 64 prior to delivery to the burner conduit. As illustrated in cross-section in FIGS. 16-17, the monolithic body of assembly 400 has two side chambers, or conduits, including a vaporization conduit 224 and a reforming conduit 210, which are connected through internal porting, as seen in FIG. 16. To further enhance heat transfer in the hydrogen-producing region, an optional perforated conductive bar 402 (such as may be formed from aluminum or another suitable thermally conductive material) may be disposed in the reforming conduit, as shown in FIG. 17. Bar 402, when present, may extend between the internal sidewalls of the hydrogen-producing region and may be formed with a sufficient thickness to promote conductive heat transfer through the hydrogen-producing region. Illustrative, non-exclusive examples of suitable constructions for conductive bar 402 are disclosed in U.S. patent application Ser. No. 12/182,959 (U.S. Patent Application Publication No. 2010/0028223), the disclosure of which is hereby incorporated by reference.

As illustrated in dashed lines in FIG. 16, a hydrogen-producing assembly 400 may (but is not required to) further include an outer housing 150, in which the monolithic body is disposed. Such a configuration may further improve thermal efficiency of the hydrogen-producing assembly. As seen in FIG. 16, when an outer housing is provided, the exhaust stream 66 may be routed from the burner conduit through passages formed between the outer housing and the monolithic body. The outer housing may include and/or be formed of insulative material to further enhance the efficiency of heat transfer from the exhaust stream(s) to the vaporization and reforming regions of the hydrogen-producing assembly. Additionally or alternatively, as shown in FIG. 17, the sides of the monolithic body may include surface features, such as heat transfer fins, or the like, to increase contact area of the monolithic body and the exhaust stream(s). Additionally or alternatively, the outer surface of the monolithic body may be anodized to form an oxide layer to act as an insulation barrier reducing heat loss to the environment.

Another illustrative, non-exclusive example of a heat transfer body 140 of a hydrogen-producing assembly 12 according to the present disclosure is shown in cross-section in FIGS. 18-19, with the hydrogen-producing assembly indicated generally at 500. The depicted embodiment of FIGS. 18-19 includes two burner conduits 212 to further improve system thermal efficiency. Also, as illustrated, the monolithic body 143 may be disposed in an outer housing 150 that does not define exhaust passages between the monolithic body and the outer housing, as does the optional embodiment of FIG. 16 discussed above. Such a configuration may improve thermal efficiency of the hydrogen-producing assembly 500 by utilizing an outer housing with insulative properties.

Another illustrative, non-exclusive example of a hydrogen-producing assembly 12 with a heat transfer body 140 according to the present disclosure, and portions thereof, is illustrated in FIGS. 20-24, and is generally indicated at 700. Hydrogen-producing assembly 700 includes a monolithic body 143 generally corresponding to the cross-section illustrated in FIG. 11. Similar to hydrogen-producing assembly 600 of FIG. 14, hydrogen-producing assembly 700 includes a heat exchange arrangement 102, in which the feed stream 16 is preheated by the reformate stream prior to being delivered to the monolithic body. As illustrated, the heat exchange arrangement includes interconnected fluid conduits that are in at least a conductive heat exchange relationship with each other. Other configurations are within the scope of the present disclosure, including nested, spiral, and shell-and-tube configurations, as well as configurations in which the fluid conduits are formed in a monolithic body, including a monolithic body 143 according to the present disclosure.

Also similar to hydrogen-producing assembly 600 of FIG. 14, hydrogen-producing assembly 700 is configured for co-current flow of the fluids through the respective conduits defined by the monolithic body. More specifically, the monolithic body of hydrogen-producing assembly 700 includes a plurality of combined vaporizing/reforming conduits 70 extending radially and concentrically about a central burner conduit 212. A heating assembly 60 receives an air stream 702 and a fuel stream 704 and delivers them to the burner conduit 212 as a combined air-fuel stream 64 via an end cap inlet manifold 141, which is illustrated in detail in FIG. 23. As perhaps best seen in FIG. 21, the heating assembly includes a flame detector 706 (such as a UV flame detector) and associated circuit board 708, although other suitable controllers/sensors may be utilized.

As perhaps best seen in FIG. 22, the hydrogen-producing assembly may further include a screen 710 positioned at or above the fuel-air inlet 218 and which is configured to retain combustion catalyst 202 and/or fuel-air mixing structure 204 within the burner conduit 212. As illustrative non-exclusive examples, screen 710 may be positioned approximately 0.25-1.5 inches (0.64-3.8 cm) or more, including 0.25, 0.5, 0.75, 1.0, 1.25, or 1.5 inches (0.64, 1.27, 1.91, 2.54, 3.18, or 3.81 cm) above the inlet to the burner conduit and/or above the fuel delivery tube of the heating assembly. Distances less than, greater than, and within these ranges are all within the scope of the present disclosure. Hydrogen-producing assembly 700 may further include a plurality of screens 712 positioned at or above the feed inlet 214 of each of the combined vaporizing/reforming conduits 70. These screens, when present, are configured to retain heat transfer material 169 positioned within the vaporization region of the conduits and/or reforming catalyst 23 within the hydrogen-producing region of the conduits 70.

Hydrogen-producing assembly 700, as seen in FIGS. 20-21, may (but are not required to) include a bracket, base, or other suitable frame 714 that is configured to facilitate suitable mounting of the hydrogen-producing assembly within a fuel processing system according to the present disclosure including the connection of the various fluid lines associated with the hydrogen-producing assembly.

With reference to FIG. 20, hydrogen-producing assemblies according to the present disclosure, including hydrogen-producing assemblies 700, may include optional insulation 156 surrounding, or otherwise adjacent to, the heat transfer body.

Another illustrative, non-exclusive example of a hydrogen-producing assembly 12 with a heat transfer body 140 according to the present disclosure, and portions thereof, is illustrated in FIGS. 25-28, and is generally indicated at 800. The heat transfer body of hydrogen-producing assembly 800 somewhat corresponds to the cross-section illustrated in FIG. 12. The heat transfer body of hydrogen-producing assembly 800, however, is comprised of a plurality of interconnected components 802 that are welded together to form a monolithic body 143. More specifically, the assembly includes a plurality of side extrusions 804, collectively defining a plurality of combined vaporizing/reforming conduits 70, and a pair of end plates 806 collectively defining the burner conduit 212 together with the side extrusions. Accordingly, when the side extrusions and the end plates are welded, or otherwise fastened, together, the monolithic body 143 is formed and the various conduits are defined therein. Such an arrangement, although not required, may be desirable from a manufacturing and design standpoint in so far as hydrogen-producing assemblies may be scaled for a desired rating simply be selecting various number of side extrusions 804. In the illustrated embodiment, four pairs of side extrusions are utilized, but it is within the scope of the present disclosure that any number of pairs of side extrusion may be utilized, including (but not limited to), 1, 2, 3, 4, 5, 1-5, 3-10, 5-10, or more pairs of side extrusions. The present disclosure is not limited to the illustrated and enumerated configurations herein. It is also within the scope of the present disclosure that the interconnected components 802 of hydrogen-producing assembly 800 not be permanently secured together (e.g., via welding), in which case the heat transfer body may not define a monolithic body in so far as the components 802 may be selectively disassembled, for example, for servicing the hydrogen-producing assembly. Other configurations are also within the scope of the present disclosure, including configurations in which two or more portions of such side extrusions are integrally formed, optionally by an extrusion process.

The illustrative, non-exclusive example of hydrogen-producing assembly 800 shown in FIG. 24 includes a pair of end plate inlet manifolds 141 and a pair of end plate outlet manifolds 141, which correspond to the opposing arrays of the combined vaporizing/reforming conduits. It is also within the scope of the present disclosure that a single end plate input manifold and a single end plate outlet manifold be utilized to direct the fluids respectively to and from the conduits defined by the heat transfer body.

As seen in FIG. 25, hydrogen-producing assembly 800 also includes a pair of electric resistance heaters 63, in the form of band heaters, positioned adjacent the lowermost side extrusions 804. Accordingly, these electric heaters may be used to thermally prime the hydrogen-producing assembly and thereby preheat at least the vaporizing region within the combined vaporizing/reforming conduits. Such heaters may also provide enough heat to preheat the hydrogen-producing regions within the combined vaporizing/reforming conduits, and/or such electric heaters may also be provided adjacent other portions of the heat transfer body 140. Other configurations are also within the scope of the present disclosure, including configurations in which an electrically powered heater is positioned within a bore, or heat conduit, formed in heat transfer body 140 or other portion of a hydrogen-producing assembly according to the present disclosure. For example, with reference to FIG. 28, an illustrative, non-exclusive example of a suitable end cap manifold 141 is illustrated. The illustrated manifold includes a heater conduit 65 for receiving a corresponding cartridge heater 71, as discussed herein. As discussed herein, other configurations are also within the scope of the present disclosure.

Hydrogen-producing assembly 800 also includes a manifold 808, which includes appropriate routing of the various fluid streams through the illustrated pipes and fittings. More specifically, with reference to the indication of feed stream 16 and reformate stream 20, it is seen that two pipes are coupled to the end cap outlet manifolds 141 and deliver the reformate stream(s) 20 to the manifold 808, which combines the separate streams into a single stream and delivers the single stream downstream of the hydrogen-producing assembly 800, via the heat exchange arrangement 102. Other configurations are also within the scope of the present disclosure, including hydrogen-producing assemblies with a single end cap outlet manifold, as discussed herein.

The cross-section illustrated in FIG. 26 reveals the burner conduit 212, which as discussed and schematically indicated may include a combustion catalyst 202 and fuel-air mixing structure 204. Furthermore, as discussed, it is within the scope of the present disclosure that a screen 710 may be position at or above the inlet to the burner conduit to retain the combustion catalyst and/or the fuel-air mixing structure therein. Similar, as schematically illustrated in FIG. 27, one or more screens 712 may be positioned at or above the inlet to the conduits 70 to retain one or both of heat conductive material 169 and reforming catalyst 23 therein.

Figure 32:
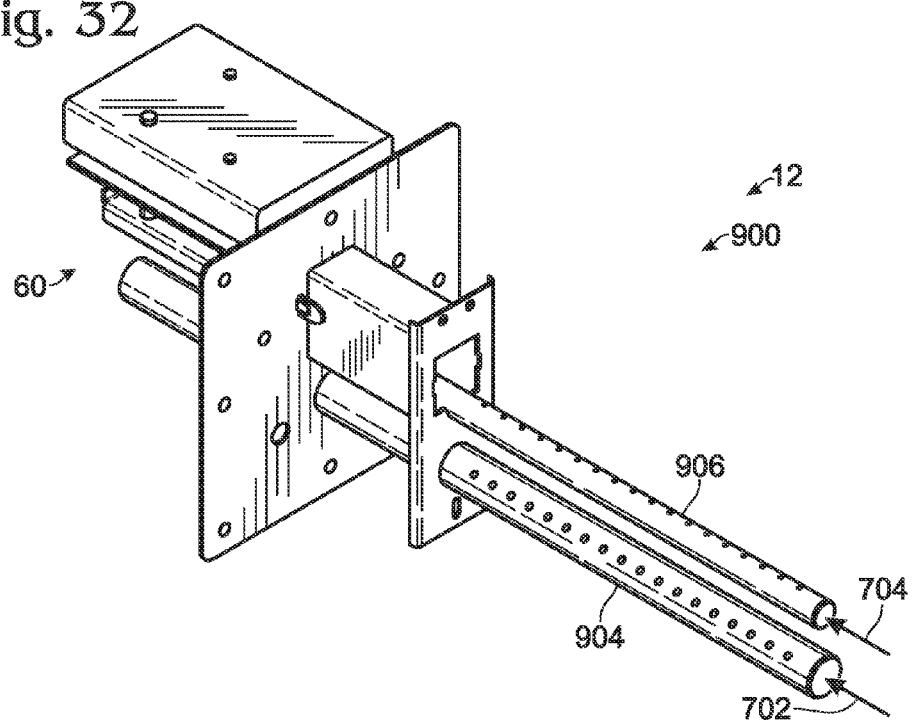
FIG. 32 is a perspective view of a burner arrangement of the hydrogen-producing assembly of FIG. 30.
Figure 33:
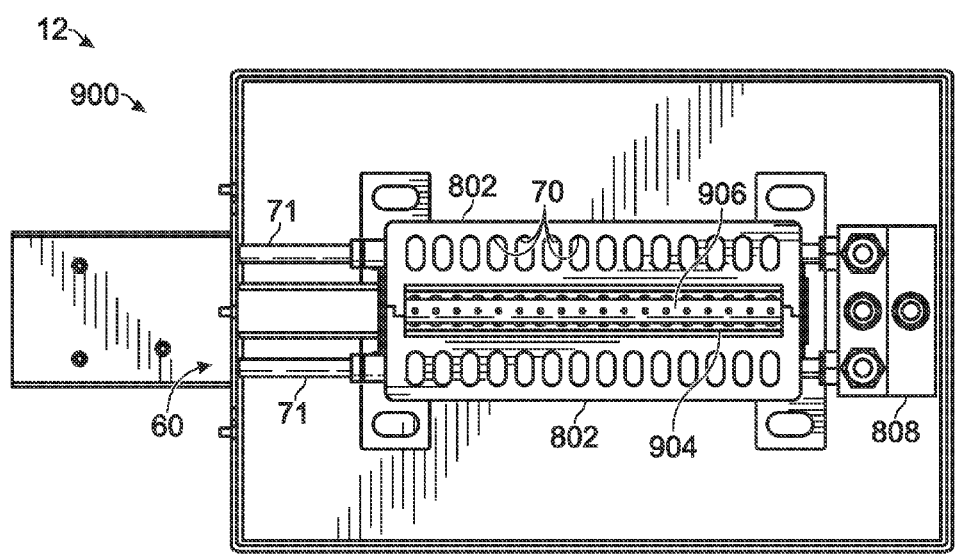
FIG. 33 is a cross-sectional view of the hydrogen-producing assembly of FIG. 30 with the cross-section taken generally along line 33-33 in FIG. 29.

Another illustrative, non-exclusive example of a hydrogen-producing assembly 12 with a heat transfer body 140 according to the present disclosure, and portions thereof, is illustrated in FIGS. 29-33, and is generally indicated at 900. The heat transfer body of hydrogen-producing assembly 900 generally corresponds to the cross-section illustrated in FIG. 12. The heat transfer body of hydrogen-producing assembly 900 includes a pair of side extrusions 902 that are welded together to form a monolithic body 143; however, it is within the scope of the present disclosure that a single extrusion form the entirety of the monolithic body. Each of the side extrusions 902 define a plurality of combined vaporizing/reforming conduits 70. Hydrogen-producing assembly 900 also includes a pair of end plate inlet manifolds and a pair of end plate outlet manifolds, which correspond to the arrays of the combined vaporizing/reforming conduits. It is also within the scope of the present disclosure that a single end plate inlet manifold and a single end plate outlet manifold be utilized to direct the fluids respectively to and from the conduits defined by the side extrusions. Additionally or alternatively, the end plate manifold of FIG. 28, having a heater conduit 65 may be utilized with hydrogen-producing assembly 900. For example, as illustrated in FIG. 33, hydrogen-producing assembly 900 may include a pair of cartridge heaters 71 that extend into heater conduits of the end cap inlet manifolds. Other configurations are also within the scope of the present disclosure.

FIG. 32 illustrates the heating assembly 60 of hydrogen-producing assembly 900. This heating assembly also may be suitable for hydrogen-producing assembly 800 of FIGS. 25-27. As indicated, the heating assembly includes an air delivery tube 904 for delivering an air stream 702 and a fuel delivery tube 906 for delivering a fuel stream 704 collectively to the burner conduit of the hydrogen-producing assembly. Other configurations are also within the scope of the present disclosure, but as seen in FIG. 32, the illustrated delivery tubes each include a plurality of perforations, through which the respect fluid is dispensed under pressure toward the burner conduit, which is positioned directly above the delivery tubes. The air stream and fuel stream are thus mixed, first, simply by dispersal through the area adjacent the delivery tubes, and then by the fuel-air mixing structure (when present) disposed within the burner conduit, as discussed herein.

In many applications, it is desirable for a hydrogen-producing assembly 12 and/or a fuel processing system 10 to produce a product hydrogen stream 14 containing at least substantially pure hydrogen gas. Accordingly, the fuel processing assembly may utilize a process that inherently produces sufficiently pure hydrogen gas. When the output stream contains sufficiently pure hydrogen gas and/or sufficiently low concentrations of one or more non-hydrogen components for a particular application, product hydrogen stream 14 may be formed directly from output stream 20. However, in many hydrogen-producing processes, output stream 20 will be a mixed gas stream that contains hydrogen gas as a majority component along with other gases. Similarly, in many applications, the output stream 20 may be substantially pure hydrogen but still contain concentrations of one or more non-hydrogen components that are harmful or otherwise undesirable in the application for which the product hydrogen stream is intended to be used.

Accordingly, fuel processing system 10 may (but is not required to) further include a purification region 24, in which a hydrogen-rich stream 26 is produced from the output, or mixed gas, stream. Hydrogen-rich stream 26 contains at least one of a greater hydrogen concentration than output stream 20 and a reduced concentration of one or more of the other gases or impurities that were present in the output stream. Purification region 24 is schematically illustrated in FIG. 1, where output stream 20 is shown being delivered to an optional purification region 24. As shown in FIG. 1, at least a portion of hydrogen-rich stream 26 forms product hydrogen stream 14. Accordingly, hydrogen-rich stream 26 and product hydrogen stream 14 may be the same stream and have the same compositions and flow rates. However, it is also within the scope of the present disclosure that some of the purified hydrogen gas in hydrogen-rich stream 26 may be stored for later use, such as in a suitable hydrogen storage assembly, subjected to a further purification process, and/or consumed by the fuel processing system (such as for use as a fuel stream for a heating assembly).

Purification region 24 may, but is not required to, produce at least one byproduct stream 28. When present, byproduct stream 28 may be exhausted, sent to a burner or other combustion source, used as a heated fluid stream, stored for later use, or otherwise utilized, stored or disposed of. In some embodiments, the byproduct stream may be delivered to the burner or other combustion-based heating assembly 60 for use as a fuel stream, such as to heat at least the hydrogen-producing region of the fuel processing assembly. In such an embodiment, it is further within the scope of the present disclosure that the byproduct stream may (but is not required to) have sufficient fuel value, when combusted by the burner or other heating assembly, to maintain the hydrogen-producing region at a suitable hydrogen-producing temperature.

It is within the scope of the disclosure that byproduct stream 28 may be emitted from the purification region as a continuous stream responsive to the delivery of output stream 20 to the purification region, or intermittently, such as in a batch process or when the byproduct portion of the output stream is retained at least temporarily in the purification region. When purification region 24 produces a byproduct stream 28, the purification region may additionally or alternatively be referred to as a separation region, as the region separates the (mixed gas) output stream 20 into hydrogen-rich stream 26 and byproduct stream 28. The purification region, when present, may form a portion of hydrogen-producing assembly 12, or may be in fluid communication therewith, such as to receive the output stream therefrom.

Purification region 24 includes any suitable device, or combination of devices, that are adapted to reduce the concentration of at least one component of output stream 20. In most applications, hydrogen-rich stream 26 will have a greater hydrogen concentration than output, or mixed gas, stream 20. However, it is also within the scope of the disclosure that the hydrogen-rich stream will have a reduced concentration of one or more non-hydrogen components that were present in output stream 20, yet have the same, or even a reduced, overall hydrogen concentration as the output stream. For example, in some applications where product hydrogen stream 14 may be used, certain impurities, or non-hydrogen components, are more harmful than others. As a specific example, in many conventional fuel cell systems (such as proton exchange membrane fuel cell systems), carbon monoxide may damage a fuel cell stack if it is present in even a few parts per million, while other non-hydrogen components that may be present in stream 20, such as water, will not damage the stack even if present in much greater concentrations. Therefore, in such an application, a suitable purification region may not increase the overall hydrogen concentration, but it will reduce the concentration of a non-hydrogen component that is harmful, or potentially harmful, to the desired application for the product hydrogen stream.

Illustrative, non-exclusive examples of suitable devices for purification region 24 include one or more hydrogen-selective membranes 30, chemical carbon monoxide removal assemblies 32, and pressure swing adsorption systems 38. It is within the scope of the disclosure that purification region 24 may include more than one type of purification device, and that these devices may have the same or different structures and/or operate by the same or different mechanisms. As discussed, hydrogen-producing fuel processing system 10 may include at least one restrictive orifice or other flow restrictor downstream of at least one purification region, such as associated with one or more of the product hydrogen stream, hydrogen-rich stream, and/or byproduct stream.

Hydrogen-selective membranes 30 are permeable to hydrogen gas, but are at least substantially, if not completely, impermeable to other components of output stream 20. Membranes 30 may be formed of any hydrogen-permeable material suitable for use in the operating environment and parameters in which purification region 24 is operated. Examples of suitable materials for membranes 30 include palladium and palladium alloys, and especially thin films of such metals and metal alloys. Palladium alloys have proven particularly effective, especially palladium with 35 wt % to 45 wt % copper. A palladium-copper alloy that contains approximately 40 wt % copper has proven particularly effective, although other relative concentrations and components may be used within the scope of the disclosure.

Hydrogen-selective membranes are typically very thin, such as a thin foil that is approximately 0.001 inches (approximately 0.0025 cm) thick. It is within the scope of the present disclosure, however, that the membranes may be formed from other hydrogen-permeable and/or hydrogen-selective materials, including metals and metal alloys other than those discussed above, as well as non-metallic materials and compositions, and that the membranes may have thicknesses that are greater or less than those discussed above. For example, the membrane may be made thinner, with commensurate increase in hydrogen flux. Examples of suitable mechanisms for reducing the thickness of the membranes include rolling, sputtering, and etching. Examples of various membranes, membrane configurations, and methods for preparing the same are disclosed in U.S. Pat. Nos. 6,221,117, 6,319,306, and 6,537,352, the complete disclosures of which are hereby incorporated by reference.

Chemical carbon monoxide removal assemblies 32 are devices that chemically react carbon monoxide and/or other undesirable components of stream 20, if present in output stream 20, to form other compositions that are not as potentially harmful. Examples of chemical carbon monoxide removal assemblies include water-gas shift reactors and other devices that convert carbon monoxide to carbon dioxide, and methanation catalyst beds that convert carbon monoxide and hydrogen to methane and water. It is within the scope of the disclosure that fuel processing system 10 may include more than one type and/or number of chemical removal assemblies 32. In addition, the chemical removal assemblies may be positioned or otherwise included in one or more chambers of body 140 that are in fluid communication with the upstream and downstream processes.

Pressure swing adsorption (PSA) is a chemical process in which gaseous impurities are removed from output stream 20 based on the principle that certain gases, under the proper conditions of temperature and pressure, will be adsorbed onto an adsorbent material more strongly than other gases. Typically, it is the impurities that are adsorbed and removed from output stream 20. The success of using PSA for hydrogen purification is due to the relatively strong adsorption of common impurity gases (such as CO, $CO_2$, hydrocarbons including $CH_4$, and $N_2$) on the adsorbent material. Hydrogen adsorbs only very weakly and so hydrogen passes through the adsorbent bed while the impurities are retained on the adsorbent material. Impurity gases such as $NH_3$, $H_2S$, and $H_2O$ adsorb very strongly on the adsorbent material and are removed from stream 20 along with other impurities. If the adsorbent material is going to be regenerated and these impurities are present in stream 20, purification region 24 preferably includes a suitable device that is adapted to remove these impurities prior to delivery of stream 20 to the adsorbent material because it is more difficult to desorb these impurities.

Adsorption of impurity gases occurs at elevated pressure. When the pressure is reduced, the impurities are desorbed from the adsorbent material, thus regenerating the adsorbent material. Typically, PSA is a cyclic process and requires at least two beds for continuous (as opposed to batch) operation. Examples of suitable adsorbent materials that may be used in adsorbent beds are activated carbon and zeolites, especially 5 Å (5 angstrom) zeolites. The adsorbent material is commonly in the form of pellets, granules, or extrudate and it is placed in a cylindrical pressure vessel utilizing a conventional packed-bed configuration. Other suitable adsorbent material compositions, forms, and configurations may be used.

PSA system 38 also provides an example of a device for use in purification region 24 in which the byproducts, or removed components, are not directly exhausted from the region as a gas stream concurrently with the purification of the output stream. Instead, these byproduct components are removed when the adsorbent material is regenerated or otherwise removed from the purification region.

In FIG. 1, purification region 24 is shown downstream from hydrogen-producing assembly 12. It is within the scope of the disclosure that region 24, when present, may alternatively form a portion of hydrogen-producing assembly 12, as is schematically illustrated in dashed lines in FIG. 1. In such an embodiment, the separation region may be thermally integrated within heat transfer body 140 along with the other components of the fuel processing assembly that are housed within the body. It is also within the scope of the disclosure that purification region 24 may include portions within and external to hydrogen-producing assembly 12.

In the context of a hydrogen-producing assembly, or fuel processing system, that is adapted to produce a product hydrogen stream that will be used as a feed, or fuel, stream for a fuel cell stack, the fuel processing assembly may be adapted to produce substantially pure hydrogen gas, or even pure hydrogen gas. For the purposes of the present disclosure, substantially pure hydrogen gas refers to hydrogen gas that is greater than 90% pure, and which may be greater than 95% pure, greater than 99% pure, and even greater than 99.5% pure. Illustrative, non-exclusive examples of components and configurations of fuel processing assemblies and fuel processing systems for producing streams of at least substantially pure hydrogen gas are disclosed in U.S. Pat. Nos. 6,319,306, 6,221,117, 5,997,594, 5,861,137, and U.S. Patent Application Publication Nos. 2001/0045061, 2003/0192251, 2003/0223926, 2006/0090397, and 2007/0062116. The complete disclosures of the above-identified patents and patent applications are hereby incorporated by reference.

Figure 34:
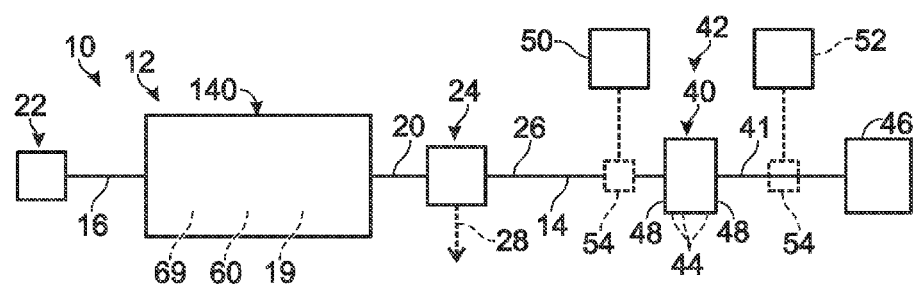
FIG. 34 is a schematic diagram of a fuel cell system according to the present disclosure, schematically illustrated together with an energy-consuming device.

As discussed, product hydrogen stream 14 may be used in a variety of applications, including applications where high purity hydrogen gas is utilized. An example of such an application is as a fuel, or feed, stream for a fuel cell stack. A fuel cell stack is a device that produces an electrical potential from a source of protons, such as hydrogen gas, and an oxidant, such as oxygen gas. Accordingly, a fuel cell stack may be adapted to receive at least a portion of product hydrogen stream 14 and a stream of oxygen (which is typically delivered as an air stream), and to produce an electric current therefrom. This is schematically illustrated in FIG. 34, in which a fuel cell stack is indicated at 40 and produces an electric current, or electrical output, which is schematically illustrated at 41. In such a configuration, in which the fuel processing assembly or fuel processing system is coupled to a fuel cell stack, the resulting system may be referred to as a fuel cell system 42 because it includes a fuel cell stack and a source of fuel for the fuel cell stack. It is within the scope of the present disclosure that fuel processing assemblies, feedstock delivery systems, and heating assemblies according to the present disclosure may be used in applications that do not include a fuel cell stack.

Fuel cell stack 40 contains at least one, and typically multiple, fuel cells 44 that are adapted to produce an electric current from an oxidant, such as air, oxygen-enriched air, or oxygen gas, and the portion of the product hydrogen stream 14 delivered thereto. A fuel cell stack typically includes multiple fuel cells joined together between common end plates 48, which contain fluid delivery/removal conduits, although this construction is not required to all embodiments. Examples of suitable fuel cells include proton exchange membrane (PEM) fuel cells and alkaline fuel cells. Others include solid oxide fuel cells, phosphoric acid fuel cells, and molten carbonate fuel cells.

The electric current, or electrical output, produced by stack 40 may be used to satisfy the energy demands, or applied load, of at least one associated energy-consuming device 46. Illustrative examples of devices 46 include, but should not be limited to, motor vehicles, recreational vehicles, construction or industrial vehicles, boats or other sea craft, tools, lights or lighting assemblies, appliances (such as household or other appliances), households or other dwellings, offices or other commercial establishments, computers, signaling or communication equipment, battery chargers, etc. Similarly, fuel cell stack 40 may be used to satisfy the power requirements of fuel cell system 42, which may be referred to as the balance-of-plant power requirements of the fuel cell system. It should be understood that device 46 is schematically illustrated in FIG. 34 and is meant to represent one or more devices, or collection of devices, that are adapted to draw electric current from the fuel cell system.

Fuel cell stack 40 may receive all of product hydrogen stream 14. Some or all of stream 14 may additionally, or alternatively, be delivered, via a suitable conduit, for use in another hydrogen-consuming process, burned for fuel or heat, or stored for later use. As an illustrative example, an optional hydrogen storage device 50 is shown in FIG. 34. Fuel processing and/or fuel cell systems according to the present disclosure may, but are not required to, include at least one hydrogen storage device. Device 50 is adapted to store at least a portion of product hydrogen stream 14. For example, when the demand for hydrogen gas by stack 40 is less than the hydrogen output of fuel processing assembly 12, the excess hydrogen gas may be stored in device 50. Illustrative examples of suitable hydrogen storage devices include hydride beds and pressurized tanks. Although not required, a benefit of fuel processing system 10 or fuel cell system 42 including a supply of stored hydrogen is that this supply may be used to satisfy the hydrogen requirements of stack 40, or the other application for which stream 14 is used, in situations when fuel processing assembly 12 is not able to meet these hydrogen demands. Examples of these situations include when the fuel processing assembly is starting up from a cold, or inactive state, ramping up (being heated and/or pressurized) from an idle state, offline for maintenance or repair, and when the fuel cell stack or application is demanding a greater flow rate of hydrogen gas than the maximum available production from the fuel processing assembly. Additionally or alternatively, the stored hydrogen may also be used as a combustible fuel stream to heat the fuel processing system or fuel cell system. Fuel processing systems that are not directly associated with a fuel cell stack may still include at least one hydrogen-storage device, thereby enabling the product hydrogen streams from these fuel processing systems to also be stored for later use.

Fuel cell system 42 may also include at least one battery 52 or other suitable energy-storage, or electricity-storing, device that is adapted to store the electric potential, or power output, produced by stack 40. When present, a battery may be utilized to power an electric heater for heating a monolithic body, as discussed herein. For example, a fuel system according to the present disclosure may be configured to power an electric heater with the battery in response to a primary power source becoming unavailable to power an energy-consuming device and/or the electric heater. Illustrative, non-exclusive examples of other energy storage devices that may be used include flywheels and capacitors, such as ultracapacitors or supercapacitors. Similar to the above discussion regarding excess hydrogen, fuel cell stack 40 may produce a power output in excess of that necessary to satisfy the load exerted, or applied, by device 46, including the load required to power fuel cell system 42. In further similarity to the above discussion of excess hydrogen gas, this excess power output may be used in other applications outside of the fuel cell system and/or stored for later use by the fuel cell system. For example, the battery or other storage device may provide power for use by system 42 during startup or other applications in which the system is not producing electricity and/or hydrogen gas. In FIG. 34 flow-regulating structures are generally indicated at 54 and schematically represent any suitable manifolds, valves, controllers, switches and the like for selectively delivering hydrogen and the fuel cell stack's power output to device 50 and battery 52, respectively, and to draw the stored hydrogen and stored power output therefrom.

Fuel cell systems according to the present disclosure may be used as backup power systems. An example of backup power systems that utilize fuel cell stacks is disclosed in U.S. Provisional Patent Application Ser. No. 61/186,732, the complete disclosure of which is hereby incorporated by reference.

In the present disclosure, several of the illustrative, non-exclusive examples have been discussed and/or presented in the context of flow diagrams, or flow charts, in which the methods are shown and described as a series of blocks, or steps. Unless specifically set forth in the accompanying description, it is within the scope of the present disclosure that the order of the blocks may vary from the illustrated order in the flow diagram, including with two or more of the blocks (or steps) occurring in a different order and/or concurrently. It is also within the scope of the present disclosure that the blocks, or steps, may be implemented as logic, which also may be described as implementing the blocks, or steps, as logics. In some applications, the blocks, or steps, may represent expressions and/or actions to be performed by functionally equivalent circuits or other logic devices. The illustrated blocks may, but are not required to, represent executable instructions that cause a computer, processor, and/or other logic device to respond, to perform an action, to change states, to generate an output or display, and/or to make decisions.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" may mean A alone, B alone, C alone, A and B together, A and C together, B and C together, A, B and C together, and optionally any of the above in combination with at least one other entity.

In the event that any of the references that are incorporated by reference herein define a term in a manner or are otherwise inconsistent with either the non-incorporated portion of the present disclosure or with any of the other incorporated references, the non-incorporated portion of the present disclosure shall control, and the term or incorporated disclosure therein shall only control with respect to the reference in which the term is defined and/or the incorporated disclosure was originally present.

As used herein the terms "adapted" and "configured" mean that the corresponding structure, element, component controller, method, or other recited subject matter is designed and/or intended to perform a given function. Thus, the use of the terms "adapted" and "configured" should not be construed to mean that a recited subject matter is simply "capable of" performing a given function but that the recited subject matter is specifically designed, positioned, created, or otherwise implemented for the purpose of performing the function. Likewise, subject matter that is recited herein as being "adapted to" perform a function may additionally or alternatively be expressed as being "configured to" perform the function, and vice versa.

The following enumerated paragraphs represent illustrative, non-exclusive ways of describing inventions according to the present disclosure. Other ways of describing inventions according to the present disclosure are also within the scope of the present disclosure.

A1 A hydrogen-producing assembly, comprising:
a heat conductive body having a length and defining:
a reforming conduit extending through the heat conductive body;
a feed inlet to the reforming conduit for receiving a feed stream into the reforming conduit;
a reformate outlet from the reforming conduit for delivering a reformate gas stream containing hydrogen gas from the reforming conduit;
a burner conduit extending through the heat conductive body and adjacent the reforming conduit;
a fuel-air inlet to the burner conduit for receiving a fuel-air stream into the burner conduit; and
an exhaust outlet from the burner conduit for delivering an exhaust stream from the burner conduit;
a reforming catalyst disposed within the reforming conduit and configured to catalyze production of the reformate gas stream from the feed stream via an endothermic reaction within a reforming temperature range;
a combustion catalyst disposed within the burner conduit and configured to catalyze ignition of the fuel-air stream via an exothermic reaction; and
a fuel-air mixing structure disposed within the burner conduit and configured to support combustion of the fuel-air stream in a combustion region of the burner conduit adjacent the fuel-air inlet;
wherein the heat conductive body is constructed to conduct heat generated by the exothermic reaction of the combustion of the fuel-air stream in the burner conduit from the burner conduit to the reforming conduit to maintain the reforming catalyst within the reforming temperature range.

A2 The hydrogen-producing assembly of paragraph A1, wherein the reforming conduit and the burner conduit extend longitudinally through the heat conductive body.

A3 The hydrogen-producing assembly of any of paragraphs A1-A2, wherein the reforming conduit extends generally parallel to the burner conduit.

A4 The hydrogen-producing assembly of any of paragraphs A1-A3, wherein the combustion region extends only for less than one half of the length of the heat conductive body.

A5 The hydrogen-producing assembly of any of paragraphs A1-A4, wherein the fuel-air mixing structure is further configured to propagate ignition of the fuel-air stream from the combustion catalyst toward the fuel-air inlet.

A6 The hydrogen-producing assembly of any of paragraphs A1-A5, wherein the fuel-air mixing structure extends between the combustion catalyst and the combustion region.

A7 The hydrogen-producing assembly of any of paragraphs A1-A6, wherein the fuel-air mixing structure extends between the combustion catalyst and the fuel-air inlet.

A8 The hydrogen-producing assembly of any of paragraphs A1-A5, wherein the fuel-air mixing structure extends adjacent the exhaust outlet and adjacent the fuel-air inlet.

A9 The hydrogen-producing assembly of any of paragraphs A1-A5, wherein the fuel-air mixing structure extends from adjacent the exhaust outlet to adjacent the fuel-air inlet.

A10 The hydrogen-producing assembly of paragraph A9, wherein the combustion catalyst is disposed on a portion of the fuel-air mixing structure adjacent the exhaust outlet.

A11 The hydrogen-producing assembly of paragraph A9, wherein the combustion catalyst is disposed only on a portion of the fuel-air mixing structure adjacent the exhaust outlet, wherein the portion extends for less than one eighth of the length of the heat conductive body.

A12 The hydrogen-producing assembly of paragraph A9, wherein the combustion catalyst is disposed only on a portion of the fuel-air mixing structure adjacent the exhaust outlet, wherein the portion extends for less than one fourth of the length of the heat conductive body.

A13 The hydrogen-producing assembly of any of paragraphs A1-A8, wherein the combustion catalyst is disposed in spaced-apart regions of the burner conduit.

A14 The hydrogen-producing assembly of any of paragraphs A1-A13, wherein the fuel-air mixing structure is configured to support flameless combustion of the fuel-air stream in the combustion region of the burner conduit.

A15 The hydrogen-producing assembly of any of paragraphs A1-A14, wherein the fuel-air mixing structure includes a porous media.

A16 The hydrogen-producing assembly of any of paragraphs A1-A15, wherein the porous media includes a ceramic material.

A17 The hydrogen-producing assembly of any of paragraphs A1-A16, wherein the porous media includes a metal material.

A18 The hydrogen-producing assembly of any of paragraphs A1-A17, wherein the porous media includes packed pellets.

A19 The hydrogen-producing assembly of any of paragraphs A1-A18, wherein the porous media includes bundles of fiber.

A20 The hydrogen-producing assembly of any of paragraphs A1-A19, wherein the porous media includes a foam material.

A21 The hydrogen producing assembly of any of paragraphs A1-A20, wherein the fuel-air mixing structure extends only through the combustion region.

A22 The hydrogen-producing assembly of any of paragraphs A1-A21, wherein the combustion catalyst is disposed within the burner conduit adjacent the exhaust outlet.

A23 The hydrogen-producing assembly of any of paragraphs A1-A22, wherein the burner conduit is defined by a burner conduit wall, and wherein the combustion catalyst is disposed only on a portion of the burner conduit wall adjacent the exhaust outlet.

A24 The hydrogen-producing assembly of paragraph A23, wherein the portion of the burner conduit wall extends for less than one eighth of the length of the heat conductive body.

A25 The hydrogen-producing assembly of paragraph A23, wherein the portion of the burner conduit wall extends for less than one fourth of the length of the heat conductive body.

A26 The hydrogen-producing assembly of any of paragraphs A1-A22, wherein the combustion catalyst is disposed on the fuel-air mixing structure.

A27 The hydrogen-producing assembly of paragraph A26, wherein the combustion catalyst is disposed on spaced-apart regions of the fuel-air mixing structure.

A28 The hydrogen-producing assembly of any of paragraphs A1-A27,
wherein the heat conductive body further defines:
an exhaust conduit extending through the heat conductive body and adjacent the reforming conduit, wherein the exhaust conduit is in fluid communication with the exhaust outlet from the burner conduit;
a hot-exhaust inlet to the exhaust conduit for receiving the exhaust stream from the burner conduit; and
a cooled-exhaust outlet from the exhaust conduit for delivering the exhaust stream from the exhaust conduit; and
wherein the heat conductive body is constructed to conduct heat from the exhaust stream in the exhaust conduit to the reforming conduit to maintain the reforming catalyst within the reforming temperature range.

A29 The hydrogen-producing assembly of paragraph A28, wherein the reforming conduit and the exhaust conduit extend longitudinally through the heat conductive body in a concentric pattern relative to the burner conduit.

A30 The hydrogen-producing assembly of any of paragraphs A1-A29, further comprising:
an outer housing;
wherein the heat conductive body is disposed at least partially within the outer housing in a spaced-apart relation relative to the outer housing to define an exhaust conduit between the heat conductive body and the outer housing, wherein the exhaust conduit is in fluid communication with the exhaust outlet for receiving the exhaust stream from the burner conduit; and
wherein the heat conductive body is constructed to conduct heat from the exhaust stream in the exhaust conduit to the reforming conduit to maintain the reforming catalyst within the reforming temperature range.

A31 The hydrogen-producing assembly of any of paragraphs A1-A30, further comprising:
an end cap manifold;
wherein the heat conductive body further defines:
a vaporizing conduit extending longitudinally through the heat conductive body and adjacent the burner conduit, wherein the vaporizing conduit is in fluid communication with the reforming conduit via the end cap manifold;
a vaporizer inlet to the vaporizing conduit for receiving the feed stream into the vaporizing conduit from a feed source; and
a vaporizer outlet from the vaporizing conduit for delivering the feed stream to the reforming conduit via the end cap manifold; and
wherein the heat conductive body is constructed to conduct heat generated by the exothermic reaction of the combustion of the fuel-air stream in the burner conduit from the burner conduit to the vaporizing conduit to vaporize liquid portions of the feed stream.

A32 The hydrogen-producing assembly of any of paragraphs A1-A31, further comprising:
an electric resistance heater positioned relative to the heat conductive body to heat the heat conductive body.

A33 The hydrogen-producing assembly of paragraph A32, wherein the heat conductive body is constructed to conduct heat from the electric resistance heater to the reforming conduit to heat the reforming catalyst to within the reforming temperature range.

A34 The hydrogen-producing assembly of paragraph A33, wherein the hydrogen-producing assembly is configured to deactivate the electric resistance heater in response to the combustion of the fuel-air stream in the burner conduit generating sufficient heat to maintain the reforming catalyst within the reforming temperature range.

A35 The hydrogen-producing assembly of paragraph A33, wherein the hydrogen-producing assembly is configured to deactivate the electric resistance heater after a predetermined period of time.

A36 The hydrogen-producing assembly of any of paragraphs A32-A35, wherein the heat conductive body is constructed to conduct heat from the electric resistance heater to the burner conduit to heat the fuel-air mixing structure to an ignition temperature at which the combustion catalyst catalyzes the ignition of the fuel-air stream.

A37 The hydrogen-producing assembly of any of paragraphs A32-A36, wherein the electric resistance heater at least partially encircles the heat conductive body.

A38 The hydrogen-producing assembly of any of paragraphs A32-A37,
wherein the heat conductive body further defines a heater conduit; and
wherein the electric resistance heater is positioned at least partially within the heater conduit.

A39 The hydrogen-producing assembly of any of paragraphs A1-A38, wherein the heat conductive body is at least partially formed from one of extrusion, machining, casting, stamping, brazing, sintering, and welding.

A40 The hydrogen-producing assembly of any of paragraphs A1-A39, wherein the heat conductive body is constructed of at least one of aluminum, aluminum alloy, copper, and copper alloy.

A41 The hydrogen-producing assembly of any of paragraphs A1-A40, wherein the heat conductive body is not constructed of steel.

A42 The hydrogen-producing assembly of any of paragraphs A1-A41, wherein the thermal conductivity of the heat conductive body is one of at least 50%, at least 100%, at least 200%, at least 400%, at least 800%, and at least 1,600% greater than the thermal conductivity of steel.

A43 The hydrogen-producing assembly of any of paragraphs A1-A42, wherein the burner conduit extends along a central longitudinal axis of the heat conductive body and the reforming conduit is spaced radially from the burner conduit.

A44 The hydrogen-producing assembly of paragraph A43, further comprising:
at least one end cap manifold;
wherein the reforming conduit is defined by:
a first reforming-conduit portion extending the length of the heat conductive body; and
a second reforming-conduit portion extending the length of the heat conductive body and in fluid communication with the first reforming-conduit portion via the at least one end cap manifold.

A45 The hydrogen producing assembly of paragraph A43, further comprising:
at least one an end cap manifold;
wherein the heat conductive body further defines:
a vaporizing conduit extending longitudinally through the heat conductive body and adjacent the burner conduit and spaced radially out from the burner conduit, wherein the vaporizing conduit is in fluid communication with the reforming conduit via the at least one end cap manifold;
a vaporizer inlet to the vaporizing conduit for receiving the feed stream into the vaporizing conduit from a feed source; and
a vaporizer outlet from the vaporizing conduit for delivering the feed stream to the reforming conduit via the at least one end cap manifold; and
wherein the heat conductive body is constructed to conduct heat generated by the exothermic reaction of the combustion of the fuel-air stream in the burner conduit from the burner conduit to the vaporizing conduit to vaporize liquid portions of the feed stream.

A46 The hydrogen-producing assembly of paragraph A45, wherein the reforming conduit and the vaporizing conduit extend through the heat conductive body in a concentric pattern relative to the burner conduit.

A47 The hydrogen-producing assembly of any of paragraphs A44-A46,
wherein the at least one end cap manifold includes a first end cap manifold and a second end cap manifold;
wherein the second reforming-conduit portion extends the length of the heat conductive body and is in fluid communication with the first reforming-conduit portion via the first end cap manifold; and
wherein the reforming conduit is further defined by a third reforming-conduit portion extending the length of the heat conductive body and is in fluid communication with the second reforming-conduit portion via the second end cap manifold.

A48 The hydrogen-producing assembly of any of paragraphs A1-A47, wherein the heat conductive body is free of external heat transfer fins.

A49 The hydrogen-producing assembly of any of paragraphs A1-A48, wherein the heat conductive body is constructed of two or more portions joined together.

A50 The hydrogen-producing assembly of paragraph A49, wherein the two or more portions are configured to be selectively separated.

A51 The hydrogen-producing assembly of paragraph A49, wherein the two or more portions are not configured to be selectively separated.

A52 The hydrogen-producing assembly of any of paragraphs A1-A51, wherein the reformate gas stream further contains other gases, the hydrogen-producing assembly further comprising:
a hydrogen-purification assembly fluidly coupled to the reformate outlet for receiving the reformate gas stream, wherein the hydrogen-purification assembly is configured to separate the reformate gas stream into a permeate stream and a byproduct stream, wherein the permeate stream has at least one of a greater concentration of hydrogen gas and a lower concentration of the other gases than the reformate gas stream, and further wherein the byproduct stream contains at least a substantial portion of the other gases.

A53 The hydrogen-producing assembly of paragraph A52, wherein the hydrogen-purification assembly includes at least one hydrogen-selective membrane.

A54 The hydrogen-producing assembly of any of paragraphs A52-A53, wherein the hydrogen-purification assembly includes a pressure swing adsorption assembly.

A55 The hydrogen-producing assembly of any of paragraphs A52-A54, wherein the hydrogen-purification assembly includes a chemical carbon monoxide removal assembly.

A56 The hydrogen-producing assembly of any of paragraphs A1-A55, wherein the heat conductive body includes a monolithic body.

A57 The hydrogen-producing assembly of any of paragraphs A1-A55, wherein the heat conductive body is a monolithic body.

A58 The hydrogen-producing assembly of any of paragraphs A1-A57, wherein the reforming conduit includes a vaporization region configured to vaporize the feed stream prior to the reforming catalyst catalyzing production of the reformate gas stream.

A59 The hydrogen-producing assembly of any of paragraphs A1-A58, wherein the heat conductive body defines a plurality of reforming conduits extending the length of the heat conductive body.

A60 The hydrogen-producing assembly of any of paragraphs A1-A59, wherein the burner conduit is generally rectangular and the plurality of reforming conduits include a first array of reforming conduits extending on a first side of the burner conduit and a second array of reforming conduits extending on a second side, generally opposite the first side, of the burner conduit.

A61 The hydrogen-producing assembly of paragraph A59, wherein the plurality of reforming conduits extend radially around the burner conduit in a concentric pattern.

A62 The hydrogen-producing assembly of any of paragraphs A59-A61, wherein each of the plurality of reforming conduits includes a hydrogen-producing region and a vaporization region.

A63 The hydrogen-producing assembly of any of paragraphs A58-A62, wherein the flow of feed stream and reformate gas stream through the reforming conduit and the flow of the air-fuel stream and the exhaust stream through the burner conduit are co-current with respect to each other.

A64 The hydrogen-producing assembly of any of paragraphs A1-A63, wherein heat conductive body defines a plurality of heat conductive fins extending into the burner conduit.

A65 A method of producing hydrogen gas using the hydrogen-producing assembly of any of paragraphs A1-A64.

A66 A fuel cell system, comprising:
the hydrogen-producing assembly of any of paragraphs A1-A64; and
a fuel cell stack in fluid communication with the reformate outlet of the heat conductive body of the hydrogen-producing assembly and configured to produce an electrical output from an oxidant and at least a portion of the hydrogen gas of the reformate gas stream to power an energy-consuming device.

A67 The fuel cell system of paragraph A65, wherein the fuel cell system is configured to provide backup power to the energy-consuming device in response to a primary power source becoming unavailable to power the energy-consuming device.

A68 The fuel cell system of paragraph A66, further comprising:
an electric resistance heater powered by the primary power source and positioned relative to the heat conductive body to heat the heat conductive body, wherein the heat conductive body is constructed to conduct heat from the electric resistance heater to the reforming conduit to heat the reforming catalyst to within the reforming temperature range during periods in which the primary power source is available;
wherein the fuel cell system is configured to activate delivery of the fuel-air stream to the burner conduit in response to the primary power source becoming unavailable to power the electric resistance heater.

A69 The fuel cell system of paragraph A68, wherein the electric resistance heater at least partially encircles the heat conductive body.

A70 The fuel cell system of paragraph A68,
wherein the heat conductive body further defines a heater conduit; and
wherein the electric resistance heater is positioned at least partially within the heater conduit.

A71 The fuel cell system of paragraph A67, further comprising:
a battery; and
an electric resistance heater selectively powered by the battery and positioned relative to the heat conductive body to heat the heat conductive body, wherein the heat conductive body is constructed to conduct heat from the electric resistance heater to the reforming conduit to heat the reforming catalyst to within the reforming temperature range;
wherein the fuel cell system is configured to power the electric resistance heater with the battery and activate delivery of the fuel-air stream to the burner conduit in response to the primary power source becoming unavailable to power the energy-consuming device.

A72 A method of producing an electrical output using the fuel cell system of any of paragraphs A66-A71.

A73 The hydrogen-producing assembly of any of paragraphs A1-A72, wherein the feed stream is, or optionally includes, a carbon-containing feedstock.

A74 The hydrogen-producing assembly of any of paragraphs A1-A73, wherein the feed stream is, or optionally includes, a hydrogen-containing feedstock.

A75 The hydrogen-producing assembly of any of paragraphs A1-A74, wherein the reforming conduit includes a plurality of reaction zones.

A76 The hydrogen-producing assembly of paragraph A75, wherein at least one of the plurality of reaction zones includes at least one of a different operating temperature, a different operating temperature range, a different operating temperature distribution, a different operating pressure, a different catalyst composition, a different catalyst concentration, a different catalyst packing density, and a different pore size than at least one other of the plurality of reaction zones.

A77 The hydrogen-producing assembly of any of paragraphs A1-A76, wherein at least one of the reforming conduit, the burner conduit, the exhaust conduit, the vaporizing conduit, and the heater conduit that may be included in the heat conductive body includes, or optionally contains or is packed with, a loose packing heat transfer material.

B1 A method of producing hydrogen gas, the method comprising:
delivering a fuel-air stream to a burner conduit extending through a heat conductive body having a length;
catalyzing, by a combustion catalyst disposed within the burner conduit, ignition of the fuel-air stream in the burner conduit;
supporting combustion of the fuel-air stream in a combustion region of the burner conduit to produce an exhaust stream;
delivering a feed stream to a reforming conduit extending through the heat conductive body and adjacent the burner conduit;
conducting heat generated by the exothermic reaction of the combustion of the fuel-air stream in the burner conduit to the reforming conduit;
catalyzing, by a reforming catalyst in the reforming conduit, production of a reformate gas stream containing hydrogen gas from the feed stream; and
maintaining the reforming catalyst within a reforming temperature range at least partially from the heat conducted from the burner conduit.

B2 The method of paragraph B1, wherein the reforming conduit and the burner conduit extend longitudinally through the heat conductive body.

B3 The method of any of paragraphs B1-B2, wherein the reforming conduit extends generally parallel to the burner conduit.

B4 The method of any of paragraphs B1-B3, wherein the combustion region extends only for less than one half of the length of the burner conduit.

B5 The method of any of paragraphs B1-B4, wherein a fuel-air mixing structure is disposed within the burner conduit and is configured to support the combustion of the fuel-air stream in the combustion region of the burner conduit.

B6 The method of paragraph B5, wherein the fuel-air mixing structure is further configured to propagate ignition of the fuel-air stream from the combustion catalyst toward a fuel-air inlet to the burner conduit.

B7 The method of any of paragraphs B5-B6, wherein the fuel-air mixing structure extends between the combustion catalyst and the combustion region.

B8 The method of any of paragraphs B5-B7, wherein the fuel-air mixing structure extends between the combustion catalyst and the fuel-air inlet.

B9 The method of any of paragraphs B5-B8, wherein the fuel-air mixing structure extends adjacent an exhaust outlet from the burner conduit and adjacent the fuel-air inlet.

B10 The method of paragraph B9, wherein the fuel-air mixing structure extends from adjacent the exhaust outlet to adjacent the fuel-air inlet.

B11 The method of paragraph B10, wherein the combustion catalyst is disposed on a portion of the fuel-air mixing structure adjacent the exhaust outlet.

B12 The method of paragraph B10, wherein the combustion catalyst is disposed only on a portion of the fuel-air mixing structure adjacent the exhaust outlet, wherein the portion extends for less than one eighth of the length of the heat conductive body.

B13 The method of paragraph B10, wherein the combustion catalyst is disposed only on a portion of the fuel-air mixing structure adjacent the exhaust outlet, wherein the portion extends for less than one fourth of the length of the heat conductive body.

B14 The method of any of paragraphs B5-B9, wherein the combustion catalyst is disposed in spaced-apart regions of the burner conduit.

B15 The method of any of paragraphs B5-B14, wherein the fuel-air mixing structure is configured to support flameless combustion of the fuel-air stream in the combustion region of the burner conduit.

B16 The method of any of paragraphs B5-B15, wherein the fuel-air mixing structure includes a porous media.

B17 The method of paragraph B16, wherein the porous media includes a ceramic material.

B18 The method of any of paragraphs B16-B17, wherein the porous media includes a metal material.

B19 The method of any of paragraphs B16-B18, wherein the porous media includes packed pellets.

B20 The method of any of paragraphs B16-B19, wherein the porous media includes bundles of fiber.

B21 The method of any of paragraphs B16-B20, wherein the porous media includes a foam material.

B22 The method of any of paragraphs B5-B21, wherein the supporting combustion includes supporting combustion, by the fuel-air mixing structure, in a portion of the burner conduit that extends for less than one half of the length of the burner conduit.

B23 The method of any of paragraphs B5-B21, wherein the fuel-air mixing structure extends only through the combustion region.

B24 The method of any of paragraphs B1-B23, wherein the combustion catalyst is disposed within the burner conduit adjacent an exhaust outlet from the burner conduit.

B25 The method of any of paragraphs B1-B24, wherein the burner conduit is defined by a burner conduit wall, and wherein the combustion catalyst is disposed only on a portion of the burner conduit wall that is adjacent the exhaust outlet from the burner conduit.

B26 The method of paragraph B25, wherein the portion of the burner conduit wall extends for less than one eighth of the length of the burner conduit.

B27 The method of paragraph B25, wherein the portion of the burner conduit wall extends for less than one fourth of the length of the burner conduit.

B28 The method of paragraph B25, wherein the combustion catalyst is disposed on spaced-apart regions of the burner conduit wall.

B29 The method of any of paragraphs B1-B28, further comprising:
delivering the exhaust stream from the burner conduit to an exhaust conduit extending through the heat conductive body and adjacent the burner conduit; and
conducting heat from the exhaust stream in the exhaust conduit to the reforming conduit.

B30 The method of paragraph B29, wherein the reforming conduit and the exhaust conduit extend longitudinally through the heat conductive body in a concentric pattern relative to the burner conduit.

B31 The method of any of paragraphs B1-B28,
wherein the heat conductive body is disposed at least partially within an outer housing in a spaced-apart relation relative to the outer housing to define an exhaust conduit between the heat conductive body and the outer housing, the method further comprising:
delivering the exhaust stream from the burner conduit to the exhaust conduit; and
conducting heat from the exhaust stream in the exhaust conduit to the reforming conduit.

B32 The method of any of paragraphs B1-B31, further comprising:
prior to delivering the feed stream to the reforming conduit, vaporizing liquid portions of the feed stream in a vaporizing conduit extending through the heat conductive body and adjacent the burner conduit; and
conducting heat generated by the exothermic reaction of the combustion of the fuel-air stream in the burner conduit to the vaporizing conduit.

B33 The method of paragraph B32, wherein the reforming conduit and the vaporizing conduit extend longitudinally through the heat conductive body in a concentric pattern relative to the burner conduit.

B34 The method of any of paragraphs B32-B33, wherein the vaporizing conduit is in fluid communication with the reforming conduit via an end cap manifold coupled to the heat conductive body.

B35 The method of any of paragraphs B1-B34, further comprising:
prior to the delivering the feed stream, heating the heat conductive body with an electric resistance heater.

B36 The method of paragraph B35, further comprising:
conducting heat generated by the electric resistance heater to the reforming conduit and heating the reforming catalyst to within the reforming temperature range.

B37 The method of any of paragraphs B35-B36, further comprising:
deactivating the electric resistance heater in response to the combustion of the fuel-air stream in the burner conduit generating sufficient heat to maintain the reforming catalyst within the reforming temperature range.

B38 The method of any of paragraphs B35-B36, further comprising:
deactivating the electric resistance heater after a predetermined period of time.

B39 The method of any of paragraphs B25-B38, further comprising:
conducting heat generated by the electric resistance heater to the burner conduit and heating the combustion catalyst to an ignition temperature at which the combustion catalyst catalyzes the ignition of the fuel-air stream.

B40 The method of any of paragraph B35-B39, wherein the electric resistance heater at least partially encircles the heat conductive body.

B41 The method of any of paragraphs B35-B39, wherein the electric resistance heater is positioned at least partially within a heater conduit defined by the heat conductive body.

B42 The method of any of paragraphs B1-B41, wherein the heat conductive body is at least partially formed from one of extrusion, machining, casting, stamping, brazing, sintering, and welding.

B43 The method of any of paragraphs B1-B42, wherein the heat conductive body is constructed of at least one of aluminum, aluminum alloy, copper, and copper alloy.

B44 The method of any of paragraphs B1-B43, wherein the heat conductive body is not constructed of steel.

B45 The method of any of paragraphs B1-B44, wherein the thermal conductivity of the heat conductive body is one of at least 50%, at least 100%, at least 200%, at least 400%, at least 800%, and at least 1,600% greater than the thermal conductivity of steel.

B46 The method of any of paragraphs B1-B45, wherein the burner conduit extends along a central longitudinal axis of the heat conductive body and the reforming conduit is spaced radially from the burner conduit.

B47 The method of paragraph B46,
wherein the reforming conduit is defined by:
a first reforming-conduit portion extending the length of the heat conductive body;
a second reforming-conduit portion extending the length of the heat conductive body and in fluid communication with the first reforming-conduit portion via an end cap manifold coupled to the heat conductive body.

B48 The method of any of paragraphs B1-B47, wherein the heat conductive body is free of external heat transfer fins.

B49 The method of any of paragraphs B1-B48, wherein the heat conductive body is constructed of two or more portions joined together.

B50 The method of paragraph B49, wherein the two or more portions are configured to be selectively separated.

B51 The method of paragraph B49, wherein the two or more portions are not configured to be selectively separated.

B52 The method of any of paragraphs B1-B51, wherein the reformate gas stream further contains other gases, the method further comprising:
after the delivering the reformate gas stream to a hydrogen-purification assembly; and
separating, by the hydrogen-purification assembly, the reformate gas stream into a permeate stream and a byproduct stream, wherein the permeate stream has at least one of a greater concentration of hydrogen gas and a lower concentration of the other gases than the reformate gas stream, and further wherein the byproduct stream contains at least a substantial portion of the other gases.

B53 The method of paragraph B52, wherein the hydrogen-purification assembly includes at least one hydrogen-selective membrane.

B54 The method of any of paragraphs B52-B53, wherein the hydrogen-purification assembly includes a pressure swing adsorption assembly.

B55 The method of any of paragraphs B52-B54, wherein the hydrogen-purification assembly includes a chemical carbon monoxide removal assembly.

B56 A method of powering an energy-consuming device, comprising:
the method of any of paragraphs B1-B55; and
delivering at least a portion of the hydrogen gas of the reformate stream to a fuel cell stack configured to produce an electrical output from an oxidant and the hydrogen gas to power the energy-consuming device.

B57 The method of paragraph B56,
wherein the delivering the fuel-air-stream and the delivering the feed stream is responsive to a primary power source becoming unavailable to power the energy-consuming device.

B58 The method of paragraph B57, further comprising:
heating the heat conductive body with an electric resistance heater powered by the primary power source prior to the primary power source becoming unavailable to power the energy-consuming device.

B59 The method of paragraph B57, further comprising:
heating the heat conductive body with an electric resistance heater powered by a battery in response to the primary power source becoming unavailable to power the energy-consuming device.

B60 The method of any of paragraphs B58-B59, wherein the electric resistance heater at least partially encircles the heat conductive body.

B61 The method of any of paragraphs B58-B59, wherein the electric resistance heater is positioned at least partially within a heater conduit extending into the heat conductive body.

B62 The method of any of paragraphs B1-B61, wherein the heat conductive body includes a monolithic body.

B63 The method of any of paragraphs B1-B61, wherein the heat conductive body is a monolithic body.

B64 The method of any of paragraphs B1-B63, wherein the reforming conduit includes a vaporization region configured to vaporize the feed stream prior to the reforming catalyst catalyzing production of the reformate gas stream.

B65 The method of any of paragraphs B1-B64, wherein the heat conductive body defines a plurality of reforming conduits extending the length of the heat conductive body.

B66 The method of any of paragraphs B1-B65, wherein the burner conduit is generally rectangular and the plurality of reforming conduits include a first array of reforming conduits extending on a first side of the burner conduit and a second array of reforming conduits extending on a second side, generally opposite the first side, of the burner conduit.

B67 The method of paragraph B65, wherein the plurality of reforming conduits extend radially around the burner conduit in a concentric pattern.

B68 The method of any of paragraphs B65-B67, wherein each of the plurality of reforming conduits includes a hydrogen-producing region and a vaporization region.

B69 The method of any of paragraphs B64-B68, wherein the flow of feed stream and reformate gas stream through the reforming conduit and the flow of the air-fuel stream and the exhaust stream through the burner conduit are co-current with respect to each other.

B70 The method of any of paragraphs B1-B69, wherein heat conductive body defines a plurality of heat conductive fins extending into the burner conduit.

B71 The method of any of paragraphs B1-B70, wherein the feed stream is, or optionally includes, a carbon-containing feedstock.

B72 The method of any of paragraphs B1-B71, wherein the feed stream is, or optionally includes, a hydrogen-containing feedstock.

B73 The method of any of paragraphs B1-B72, wherein the reforming conduit includes a plurality of reaction zones.

B74 The method of paragraph B73, wherein at least one of the plurality of reaction zones includes at least one of a different operating temperature, a different operating temperature range, a different operating temperature distribution, a different operating pressure, a different catalyst temperature, a different catalyst concentration, a different catalyst packing density, and a different pore size than at least one other of the plurality of reaction zones.

B75 The method of any of paragraphs B1-B74, wherein at least one of the reforming conduit, the burner conduit, the exhaust conduit, the vaporizing conduit, and the heater conduit that may be included in the heat conductive body includes, or optionally contains or is packed with, a loose packing heat transfer material.

INDUSTRIAL APPLICABILITY

The hydrogen-producing assemblies, fuel cell systems, methods of producing hydrogen gas, and method of powering an energy-consuming device that are disclosed herein are applicable to the hydrogen- and energy-production industries, including the fuel cell industries.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions, and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. A method of producing hydrogen gas, the method comprising:
    delivering a fuel-air stream to a burner conduit extending through and defined by a heat conductive body;
    catalyzing, by a combustion catalyst disposed within the burner conduit, combustion of the fuel-air stream in the burner conduit to produce an exhaust stream;
    delivering a feed stream to a vaporizing region defined by the heat conductive body;
    vaporizing the feed stream in the vaporizing region to produce a vaporized feed stream;
    delivering the vaporized feed stream to a reforming conduit extending through and defined by the heat conductive body and adjacent the burner conduit, wherein the heat conductive body extends between the burner conduit and the reforming conduit, and surrounds the burner conduit and the reforming conduit;
    catalyzing, by a reforming catalyst in the reforming conduit, production of a reformate gas stream containing hydrogen gas from the feed stream;
    conducting, through the heat conductive body, heat generated by the combustion of the fuel-air stream to the reforming conduit to maintain the reforming catalyst within a reforming temperature range;
    conducting, through the heat conductive body, heat generated by the combustion of the fuel-air stream to the vaporizing region to support vaporization of the feed stream; and
    wherein catalyzing by a combustion catalyst disposed within the burner conduit includes:
        catalyzing, by the combustion catalyst disposed within the burner conduit only in a portion of the burner conduit adjacent to an exhaust outlet of the burner conduit, ignition of the fuel-air stream in the burner conduit; and
        supporting combustion of the fuel-air stream in a combustion region of the burner conduit to produce an exhaust stream.

2. The method of claim 1, wherein the reforming conduit includes a plurality of reforming conduits, and further wherein delivering the vaporized feed stream includes delivering the vaporized feed stream to each of the plurality of reforming conduits.

3. The method of claim 1, wherein the burner conduit includes a heat transfer structure that forms a portion of the heat conductive body, wherein the heat transfer structure includes a plurality of heat transfer fins, and further wherein the conducting includes conducting through at least a portion of the plurality of heat transfer fins.

4. The method of claim 1, wherein the burner conduit includes a heat transfer structure, wherein the heat transfer structure includes a plurality of loose packing heat transfer structures, and further wherein the conducting includes conducting through at least a portion of the plurality of loose packing heat transfer structures.

5. The method of claim 1, wherein the vaporizing region forms a portion of the reforming conduit, and further wherein the vaporizing includes vaporizing the feed stream within the reforming conduit.

6. The method of claim 1, wherein the burner conduit includes a heat transfer structure that foams a portion of a monolithic body that extends within the burner conduit.

7. The method of claim 6, wherein the monolithic body forms a portion of the heat conductive body.

8. The method of claim 1, wherein the burner conduit extends longitudinally through the heat conductive body, and the reforming conduit extends longitudinally through the heat conductive body.

9. The method of claim 1, wherein the burner conduit extends along a central longitudinal axis of the heat conductive body, and the reforming conduit is spaced radially from the burner conduit.

10. The method of claim 1, further comprising maintaining the reforming catalyst within the reforming temperature range at least partially from the heat conducted from the burner conduit, wherein the reforming temperature range is 250-315° C.

11. The method of claim 1, wherein the portion of the burner conduit extends for less than one fourth of a length of the burner conduit.

* * * * *